United States Patent
Granot et al.

(10) Patent No.: US 11,157,294 B2
(45) Date of Patent: Oct. 26, 2021

(54) USER INTERFACE ADVISOR

(71) Applicants: Ilan Yehuda Granot, Union City, CA (US); Zvi Or-Bach, Haifa (IL)

(72) Inventors: Ilan Yehuda Granot, Union City, CA (US); Zvi Or-Bach, Haifa (IL)

( * ) Notice: Subject to any disclaimer, the term of this patent is extended or adjusted under 35 U.S.C. 154(b) by 0 days.

(21) Appl. No.: 17/076,378

(22) Filed: Oct. 21, 2020

(65) Prior Publication Data
US 2021/0034388 A1    Feb. 4, 2021

Related U.S. Application Data

(63) Continuation of application No. 16/573,667, filed on Sep. 17, 2019, now Pat. No. 10,846,105.

(60) Provisional application No. 62/739,213, filed on Sep. 29, 2018.

(51) Int. Cl.
| | |
|---|---|
| G06F 3/00 | (2006.01) |
| G06F 9/451 | (2018.01) |
| H04L 29/08 | (2006.01) |
| G06F 3/0481 | (2013.01) |
| G06F 16/28 | (2019.01) |
| G06F 3/01 | (2006.01) |

(52) U.S. Cl.
CPC ............ G06F 9/451 (2018.02); G06F 3/0481 (2013.01); G06F 16/285 (2019.01); H04L 67/10 (2013.01); H04L 67/22 (2013.01)

(58) Field of Classification Search
CPC ............... G06F 3/04847; G06F 3/0482; G06F 16/9535; G06F 16/248

See application file for complete search history.

(56) References Cited

U.S. PATENT DOCUMENTS

| | | | | |
|---|---|---|---|---|
| 10,496,905 | B2* | 12/2019 | Solomon | G06N 5/047 |
| 2004/0075677 | A1* | 4/2004 | Loyall | G06T 13/40 |
| | | | | 715/706 |
| 2004/0225955 | A1* | 11/2004 | Ly | G06Q 10/06 |
| | | | | 715/273 |
| 2005/0054381 | A1* | 3/2005 | Lee | G06F 3/0482 |
| | | | | 455/557 |
| 2005/0143138 | A1* | 6/2005 | Lee | G06F 3/011 |
| | | | | 455/566 |
| 2013/0290106 | A1* | 10/2013 | Bradley | G06Q 90/20 |
| | | | | 705/14.64 |

(Continued)

*Primary Examiner* — Nicholas Augustine
(74) *Attorney, Agent, or Firm* — PowerPatent; Bao Tran

(57) ABSTRACT

A server system, the server system including: a memory processor including memory; a communication link, a first program designed to construct a list of end-goals for a software tool, where the memory includes a plurality of prior user interface experience records, and where each of the plurality of prior user interface experience records represent a user interaction with a plurality of user interface screens of the software tool; a second program designed to build a user experience graph based on the plurality of prior user interface experience records, where the construct a list of end-goals for a software tool includes at least one end-goal; and a third program designed to use the list of end-goals to communicate to at least one user of the software tool suggestion notes based on popular paths along the user experience graph leading towards the end-goal to help the at least one user interface with the software tool.

20 Claims, 19 Drawing Sheets

(56) References Cited

U.S. PATENT DOCUMENTS

| | | | | |
|---|---|---|---|---|
| 2014/0223462 A1* | 8/2014 | Aimone | ................ | G16H 40/67 |
| | | | | 725/10 |
| 2016/0170998 A1* | 6/2016 | Frank | ................... | H04W 4/021 |
| | | | | 707/748 |
| 2017/0300933 A1* | 10/2017 | Mascaro | ................ | G06N 7/005 |
| 2019/0129732 A1* | 5/2019 | Sivertson | ................ | G06F 8/433 |

* cited by examiner

USER INTERFACE ADVISOR

CROSS-REFERENCE OF RELATED APPLICATIONS

This application claims the benefit of U.S. patent application Ser. No. 16/573,667, which was filed on Sep. 17, 2019, which claims the benefit of U.S. provisional application 62/739,213, which was filed on Sep. 29, 2018. The entire contents of the foregoing application are incorporated herein by reference.

BACKGROUND OF THE INVENTION

More and more people are interacting with computer based applications. In many cases these interaction are not routine, but rather very occasional. Hence, the users may not know or remember all of the common commands, etc. for the use of a specific computer based application. While these applications are designed to be friendly for their users, some users face difficulties and their interactions with some of these applications which are time consuming and frustrating.

SUMMARY

The invention includes a reporting module resident in the user unit or in the software application ("SW") or in the platform running the software application, which is reporting the user's interaction with an application to the Advisor system which could be a cloud based system. The Advisor aggregates these user's interaction records and selects those records that are considered from an 'experienced' users to form 'learning'. Then it constructs advice to be offered to inexperienced users as they engage and interact with the application ("SW").

In one aspect, a server system, the server system comprising: a memory processor; and a communication link, wherein said server system comprises a program designed to construct a user interface experience graph from a plurality of prior user experience interfacing with a specific software application, and wherein said prior user experience interfacing had been received into a memory of said memory processor by said communication link.

In another aspect, a server system, the server system comprising: a memory processor; and a communication link, wherein said server comprises a program designed to construct a list of end-goals for a specific software application from a plurality of prior user experience interfacing with a specific software application, and wherein said prior user experience interfacing has been received into a memory of said memory processor by said communication link.

In another aspect, a server system, the server system comprising: a memory processor; and a communication link, wherein said server comprises a program designed to construct a list of popular user paths for a specific software application from a plurality of prior user experience interfacing with a specific software application, wherein said prior user experience interfacing has been received into a memory of said memory processor by said communication link.

In another aspect, a server system, the server system comprising: a memory processor comprising memory; a communication link, wherein said memory comprises a plurality of prior user interface experience records, and wherein each of said prior user interface experience records represent a user interaction with a plurality of user interface screens of a software tool; a first program designed to categorize user interface experience into at least two groups, wherein said at least two groups comprise an experienced users group and an inexperienced users group, wherein said experienced users group comprises individual experienced users, and wherein each one of said individual experienced users demonstrates a better than average proficiency of said user software tool; a second program designed to construct a user interface experience graph from said experienced users group's interface experience with said software tool; and a third program designed to use said user interface experience graph to communicate suggestion notes to at least one user of said software tool, wherein said suggestion notes are designed to help said at least one user interface with said software tool.

In another aspect, a server system, the server system comprising: a memory processor comprising memory; a communication link, a first program designed to construct a list of end-goals for a software tool, wherein said memory comprises a plurality of prior user interface experience records, and wherein each of said plurality of prior user interface experience records represent a user interaction with a plurality of user interface screens of said software tool; a second program designed to build a user experience graph based on said plurality of prior user interface experience records, wherein said construct a list of end-goals for a software tool comprises at least one end-goal; and a third program designed to use said list of end-goals to communicate to at least one user of said software tool suggestion notes based on popular paths along said user experience graph leading towards said end-goal to help said at least one user interface with said software tool.

In another aspect, a server system, the server system comprising: a memory processor comprising memory; a communication link, wherein said memory comprises a plurality of prior user interface experience records, wherein each of said records represent a user interaction with a plurality of user interface screens of a software tool; a first program designed to categorize user experience into at least two groups, wherein said at least two groups comprise an experienced users group and an inexperienced users group, wherein said experienced users group comprises individual experienced users, and wherein each one of said individual experienced users demonstrates proficiency in said software tool; a second program designed to construct a list of popular user paths from said experienced users group's interface experience of said software tool; and a third program designed to use said list of popular user paths to communicate to at least one user of said software tool suggestion notes to help said at least one user interface with said software tool.

BRIEF DESCRIPTION OF THE DRAWINGS

Various embodiments of the invention could be understood and appreciated more fully from the following detailed description, taken in conjunction with the drawings in which:

FIGS. 5A-5B are examples of a software screen "SW" with suggestions with possible desired end goals;

FIGS. 8A-8C are examples of learning and suggestions when entering user specific data;

FIGS. 9A-9C are examples of learning a general action from user specific entries and suggestions formed by this learning;

DETAILED DESCRIPTION

Figure 1:
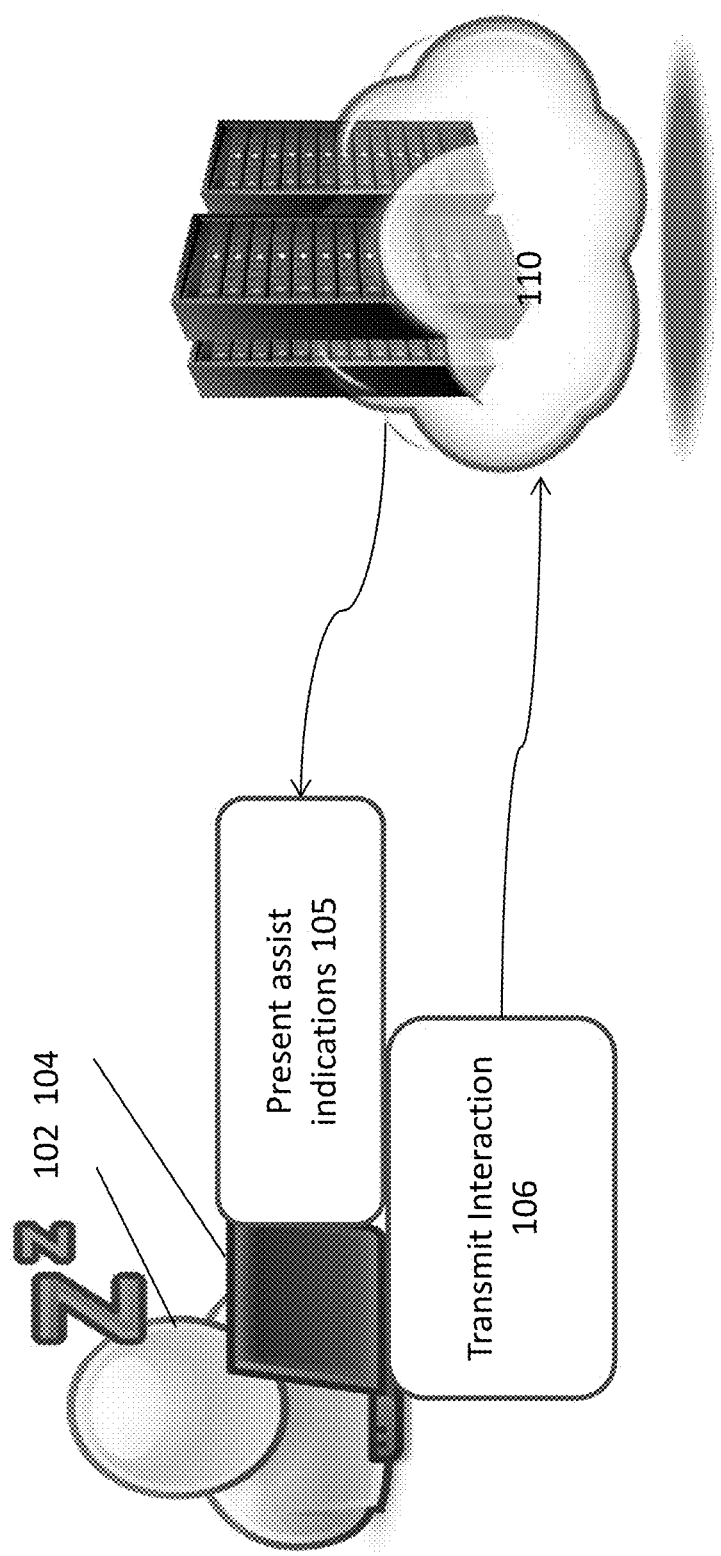
FIG. 1 is an example illustration of the overall system.

Embodiments of the invention are described herein with reference to the drawing figures. Persons of ordinary skill in the art could appreciate that the description and figures illustrate rather than limit the invention and that in general the figures are not drawn to scale for clarity of presentation. Such skilled persons could also realize that many more embodiments are possible by applying the inventive principles contained herein and that such embodiments fall within the scope of the invention which is not to be limited except by the appended claims.

FIG. 1 illustrates the overall system. A user 102 is interacting with an application, for example, "SW", using computer 104. At least two software tools may be installed on the user computer 104. These tools could be also installed on a computer serving the SW, for example, if the SW is Web-based or another form of remote service (Server, Cloud, . . . ). A first tool Interaction Transmitter 106 which monitors user interactions via the tracking of the software functions or the computer's mouse and keyboard, and transmits the interactions to the cloud computer to the UI (User Interface) Advisor 110 ("Advisor"), and a second tool, the Assistor 105, which is designed to help the user with the effort to use the SW. It should be noted that while herein a description is made using a specific system architecture, these are done to simplify the description. An artisan in the art could know how to apply these concepts to other alternative system architectures such as a specific dedicated server, a tool that could be resident in the same tool that the SW is running on, and so forth. The help could include indications of the most popular choices made by prior experienced users and examples of how other users had filled various data entries requested by the application. Hints from the Assistor 105 could pop-up on the computer screen once the user moves the cursor near a field of requested data entry by the application.

Additional option in the case of a SW being used on external computer such as a server, is to track user interactions with the SW, by using a server-side tracking module instead of a client-side Interaction Transmitter 106. The server-side tracking could track the user's operations through monitoring the functions that are executed on the server computer due to the user's interaction of a session. For example, a user that filled in a form such as in FIG. 8A could have the input data received by the server and the user could be then sent to a next page. These operations performed by the server of storing the user input and sending the user's device to a next screen could be recorded by the system for learning. The Present assist ("Assistor") 105 could also be operating on the server side and forward to the user screen accordingly.

The interaction Transmitter 106 could first transmit to the cloud for the UI Advisor 110, the specifics of the application and the specifics of the computing system such as the operating system or the browser being used and then transmit each of the choices made by the user using a mouse and keyboard, or touch/voice/thought if such is used. This data upload does not need to include identifying or private information with respect to the user, as the information in the cloud could, as a user and/or administrator option/choice, need not be traceable back to the specific user.

In the cloud, completed sessions that had been received are stored in a successful interactions file. Completed sessions are defined per specific application, for example if the application is an airline passenger check-in, then the system producing a Boarding Card could be considered completion of that specific application transaction. An end of a session may include closing the specific application. The UI Advisor 110 could then categorize sessions into at least two groups. Sessions that are done by 'experienced' users, and sessions that are done by 'inexperienced' users. The users' screening could be according to few criteria, such as, an 'experienced' user is one that completed:

a. A session which took a shorter time than the average session.

b. A session which had fewer 'back steps' than the average session.

Figure 3:
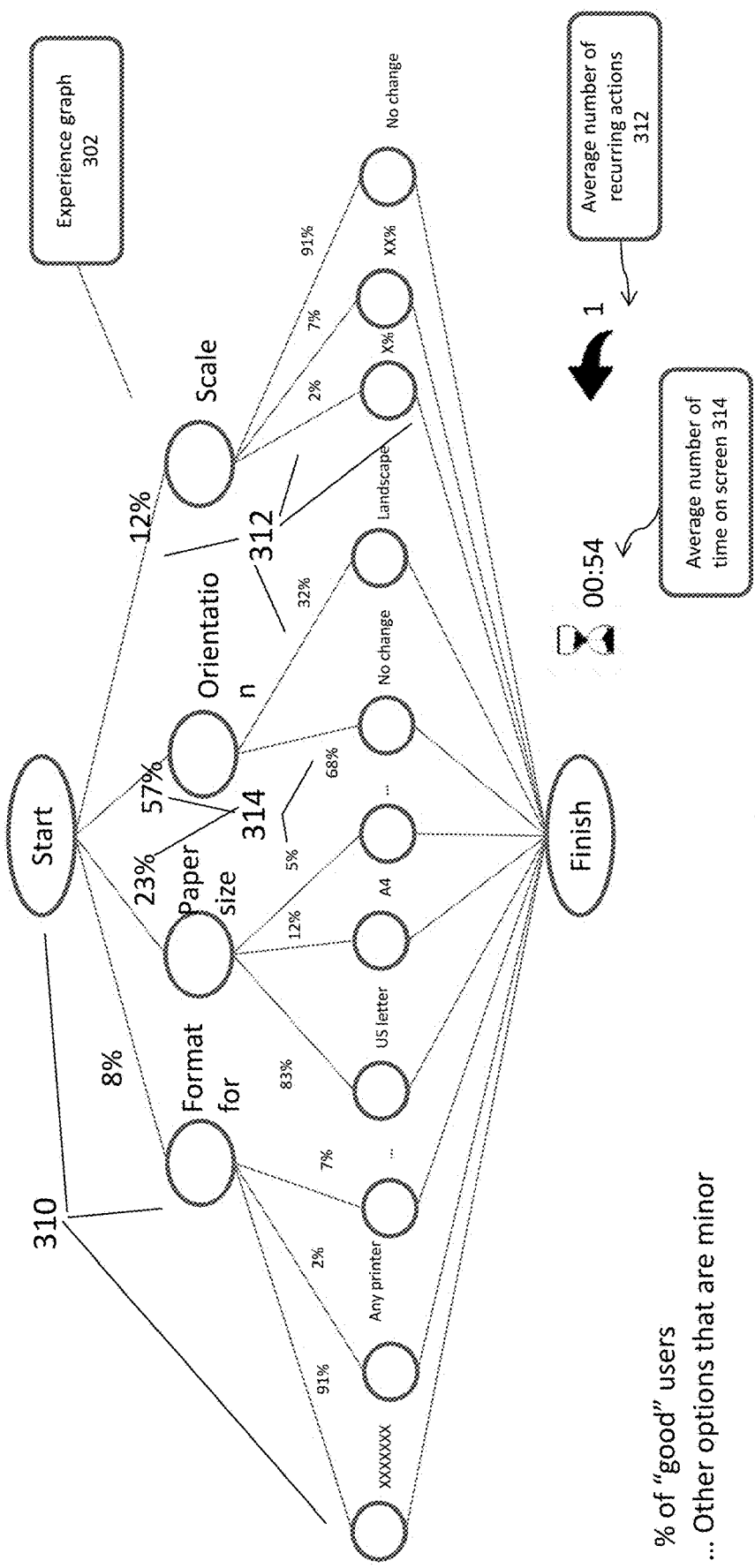
FIG. 3 is an example illustration of an experience graph.

The following step in the UI Advisor 110 could be the learning. The learning process may include forming an Experience Graph 302, for example, such as is illustrated in FIG. 3. Experience graph 302 could be structured so that each node represents a possible display screen of the application. An edge from a node represents a transition to another node as a result of an input from the user, using the mouse and/or the keyboard or 'touch/voice/thought'. The attribute associated with such an edge between nodes could represent the probability such a transition was used by an 'experienced' user or a set of 'experienced' users.

The Experience Graph 302 data may then be transmitted to the Assistor 105 to help future users (or follow-on sessions of the same user) with the SW. The Assistor 105 could then indicate for every node the popular choice made by prior 'experienced' users, and could present pop-up examples for specific fields of how 'experienced' users had clicked or filled them. The Assistor could include a detector for a user that if it exceeded the average time or the number of recurring actions, then the pop-up example would trigger. A 'leniency' factor could also be built-in so that the trigger is delayed an additional set number of seconds or recurring actions than the average or initially calculated or set trigger value.

The Transmitter 106 tool could include privacy protection so that no name, address or any personal data is transmitted. Such could be achieved by a utility which transmits a repeat of the first letter for each following letter and the same number for each following number. Alternatively it could use 'X' for capital letter, 'x' for normal letter, 9 for number and so forth.

Figure 2A:
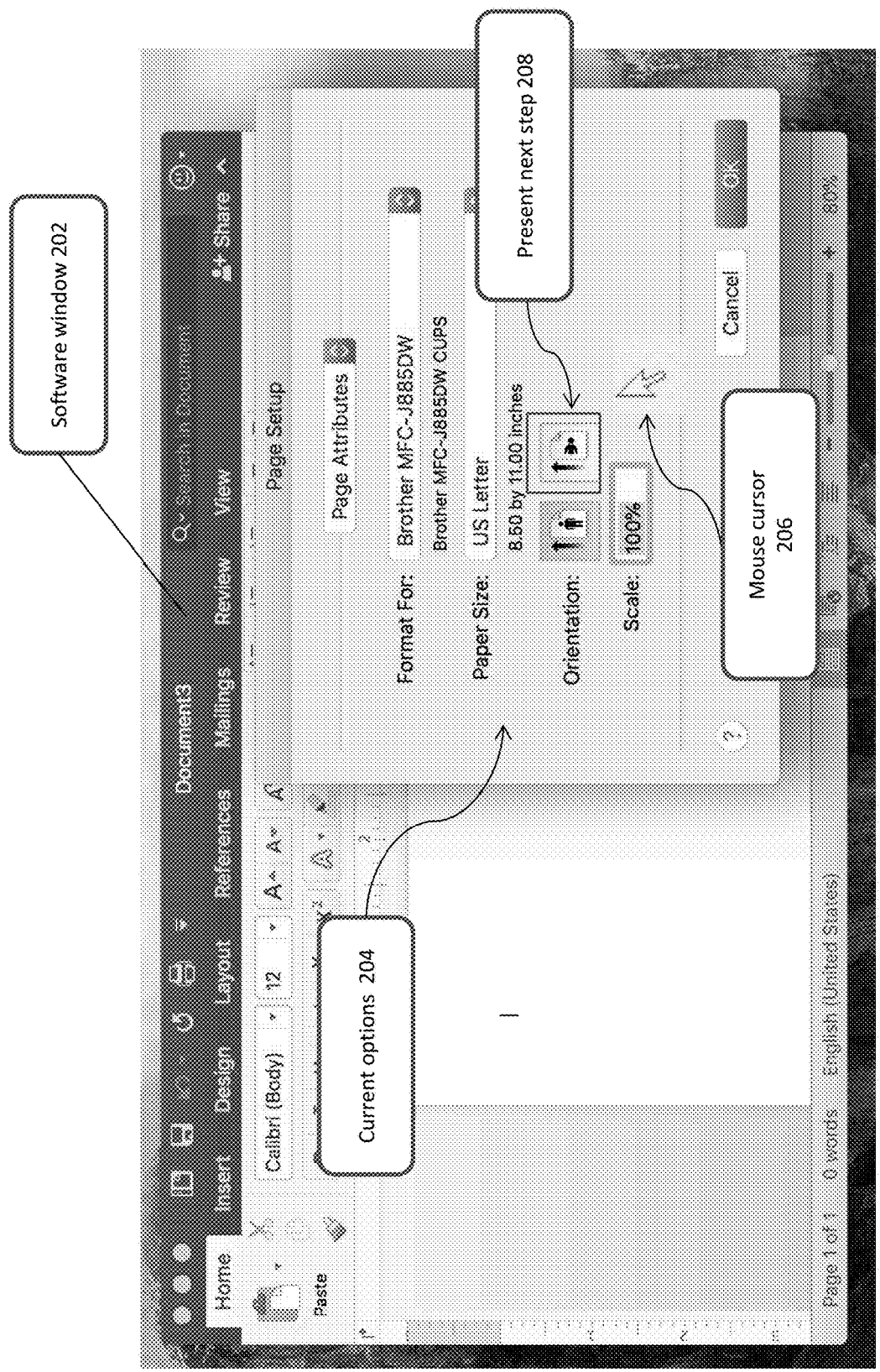
FIGS. 2A-2B are example illustrations of a software screen with choices.

FIG. 2A illustrates an example display screen for an application such as setting the page attribute of a printer. This application, for example, could be a sub-application of the windows Word application software window 202. The application screen may display current options 204 of the specific node and the position of the Mouse curser 206 controlled by the computer mouse relative to other elements on the screen and the indication for the choice to transition to the next node present next step 208.

Figure 2B:
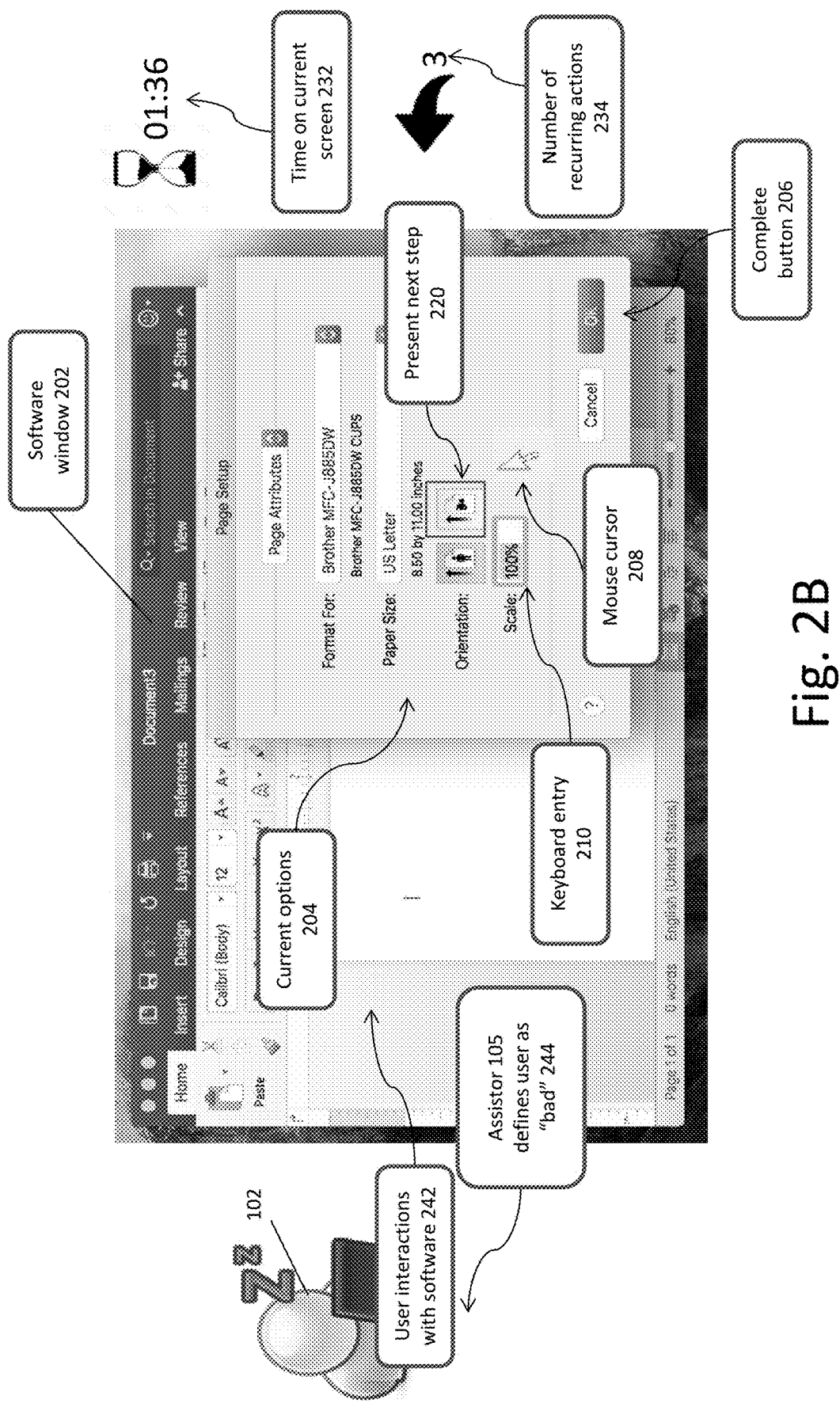

FIG. 2B illustrates additional exemplary indications that could be tracked by Transmitter 106. For example, a keyboard entry 210, the time the user has already been on the specific screen 232, the number of recurring actions 234. And choices that could be added by Assistor 105 such as a suggestion for a next step 220, and a key choice to complete the session 206 of software window 202.

FIG. 3 illustrates an example of an Experience Graph 302 for an exemplary Printing. It illustrates the common 'nodes' for this application. Also, Experience Graph 302 presents previous experienced user choices of nodes as percent indicators for the relevant edges. In addition the average number of 'experienced' users recurring actions 312 and their average amount of time on screen 314 may be calculated and presented.

The UI Advisor 110 could include a continuous learning mode in which additional users experience is added in. The addition of a new experience could be designated the same 'weight' as an old experience, and could be calculated as follows:

AVn represent the average of 'n' old 'experienced' users
AVm represent the average of 'm' new 'experienced' users
=>AV(n+m)=(n*AVn+m*AVm)/(n+m)

Other forms of continuous learning could be used in which old data has less 'weight' then new data. These and other types of statistics calculation could be designed by artisan in the art.

The selection of 'experienced' users could account for the choices they had made in using the application. This could be important for more complex applications in which early choices could result in longer average completion times than other choices. As an example a SW might have an introductory tutorial to help inexperienced users. A choice of a user to go through the introductory tutorial could be an indicator of that user being an "inexperienced" user.

The UI Advisor 110 could include a module to help the Application developer. Such learning could be guided by the 'inexperienced' users-experience ("UX") and their 'weak' choices that are associated with their sessions. The application developer could later release updates for the application in an effort to reduce the probability for these 'weak' choices.

It could be useful if the most popular elements could appear first in different screens of the SW. Thus, another option is that the system could perform an automatic structuring of the screens of the SW. This could be done by having a module on the computer that sorts the elements that are displayed on the user screen by their "experienced users" usage popularity, and then arranging them so they could appear by that order. For example, the system could change the structure of a form such that it could display its fields by their order of popularity, or their order of popularity by experienced or inexperienced users, from top to bottom. And, could change the order of the top menu items so that they could be displayed by their order of popularity from left to right. Furthermore, the software could have more than one display state. For example, one mode for "inexperienced" users could display fewer options on the screen, whereas the "experienced" users could see all the options. These modes could also have a button on the screen to manually switch between modes.

Figure 4:
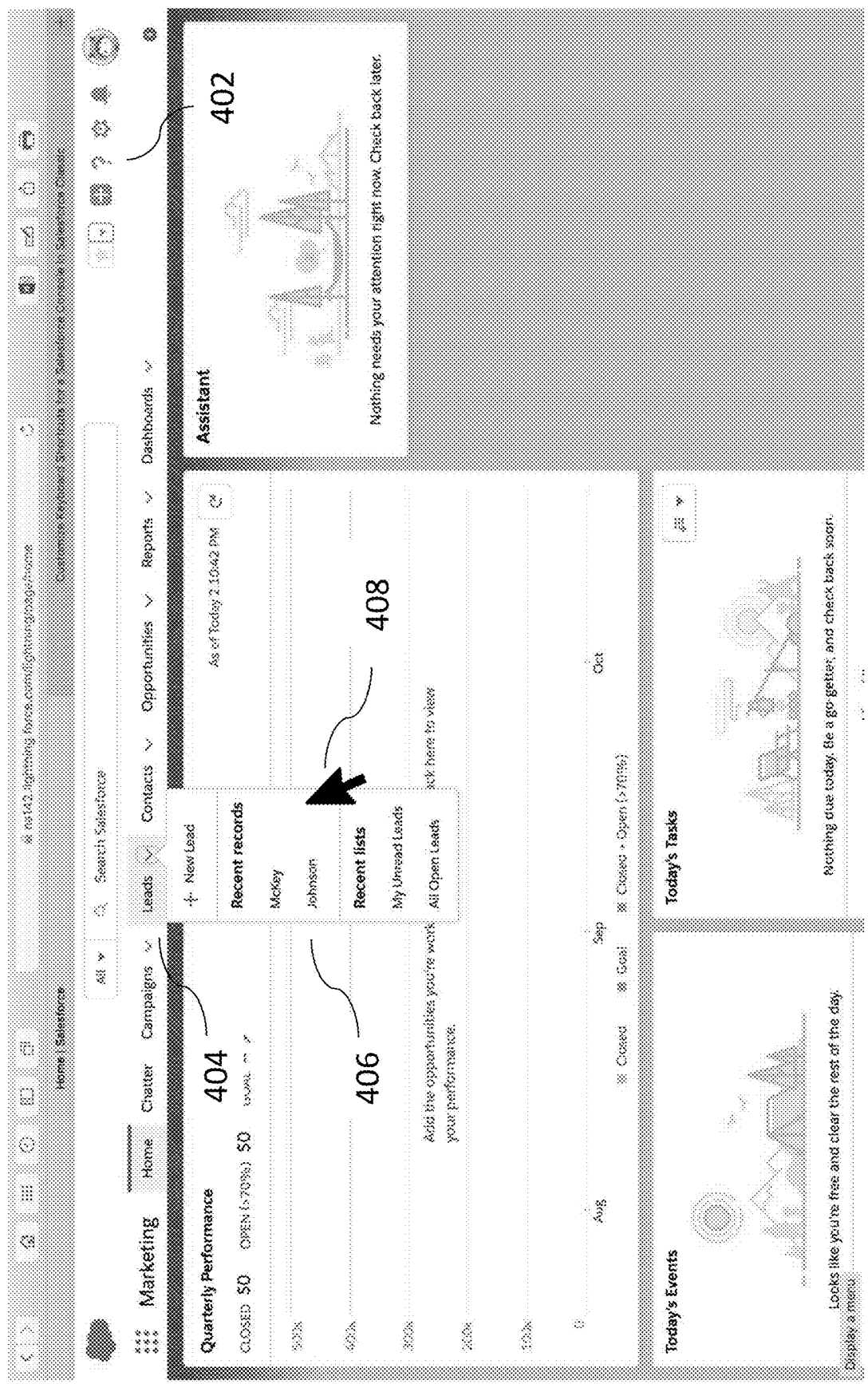
FIG. 4 is an example of software screen "SW" with the user stays idle hovering over a menu item.

There are a few parameters that could be used to categorize a user as "experienced" or "inexperienced". If the user's parameters are better or equal to the average then the user could be considered 'experienced', otherwise the user may be considered 'inexperienced'. As illustrated in FIG. 4, we use the well-known software platform Salesforce.com which is an example of an online application software ("SW"). We measure at least the following parameters of a user using the SW: The elapsed time between when the page has finished loading and the first interaction (keyboard input or mouse click) of the user. The elapsed time between the interactions with the elements shown on the screen. The time it took a user to complete a screen (or a form), for example, the system can detect when the user's browser is directed to another screen of the SW. The elapsed time it has taken the user to complete a known path of screens in the SW to achieve an objective.

The system could also take into consideration the case where the user has switched to a different program or window and in such case the elapsed time could stop counting and could resume counting once the SW window or screen could become 'in-focus' again. Such a situation can be detected, for example, when the SW screen or window is not defined as 'in focus' by the browser.

An additional option is to detect when a user is not using the SW, that is, the user is not "attendant", by tracking the mouse activity and keyboard inputs. This is done in order to pause the elapsed time in such a case. It is common that when a user does not know what to do his hand holding the mouse could still move as this occurs naturally. Thus, if no mouse movement or keyboard input is detected at all, then the elapsed time could pause. So, for example, a user that left his desktop computer for some time with the SW still open on the screen may not necessarily be detected as "inexperienced".

Furthermore, a user could be considered 'inexperienced' in the following cases: The user is going back and forth between screens of the SW without making selections or actions. When a user is scrolling up and down without making selections or actions. When a user uses a "help" function 402. When clicking 'menu' 404, or hovering with a mouse cursor 408 over 'menu-options' 406, but staying idle, that is without making further selections.

When the system detects a user as 'inexperienced' the system could activate an advisor action such as showing indicators on the user's screen, that is, it could show 'suggestions'. Such 'suggestions' could include a note 714 telling the user about the offered help, and could indicate, for example, with 'markers' 712, 716, 718 the most popular choices made by previous 'experienced' users on that specific SW screen. Next to the option the system may indicate percentages 720, 722, 724 referencing the percentage of 'experienced' users that had chosen that option. In case the system 'learned' from 'experienced' users that it is needed to hover over an element in order to perform an action then it could show that step as a suggestion as well which may include text such as "hover over here" next to that suggestion. The suggestions could be the most popular branches that were pulled from an Experience Graph which correlates to that specific screen 726. This could be done while also taking into consideration other factors about the user such as the "path" traveled.

In addition, the system can use a user's prior characterization. So if a specific user has been characterized as an "experienced" user in the past than he could be considered as "experienced" from now on, or for a subset of offered related software. The user detection could be done with 'cookies' or his email or other form of ID. Furthermore, known information about the user may be, for example, position in the company and this information can be considered in the learning process by relating that user to other known users that have the same position in a workplace. Consequently, the suggestions that could show on the user's computer may be, for example, the choices that were made by 'experienced' users which have the same position as the user, or some other relationship of the specific user to 'related' users via experiences, position, education (in-house, etc.), aptitudes, performance test and/or appraisals, and so on.

Another option to achieve learning from 'experienced' users is that the system could use a multilevel characterization. So each "experienced" user could get a score and the learning from "experienced" users could use weights according to their scores, so a high level 'experienced' user could have more effect than a low level 'experienced' user in the learning presented.

Figure 6A:
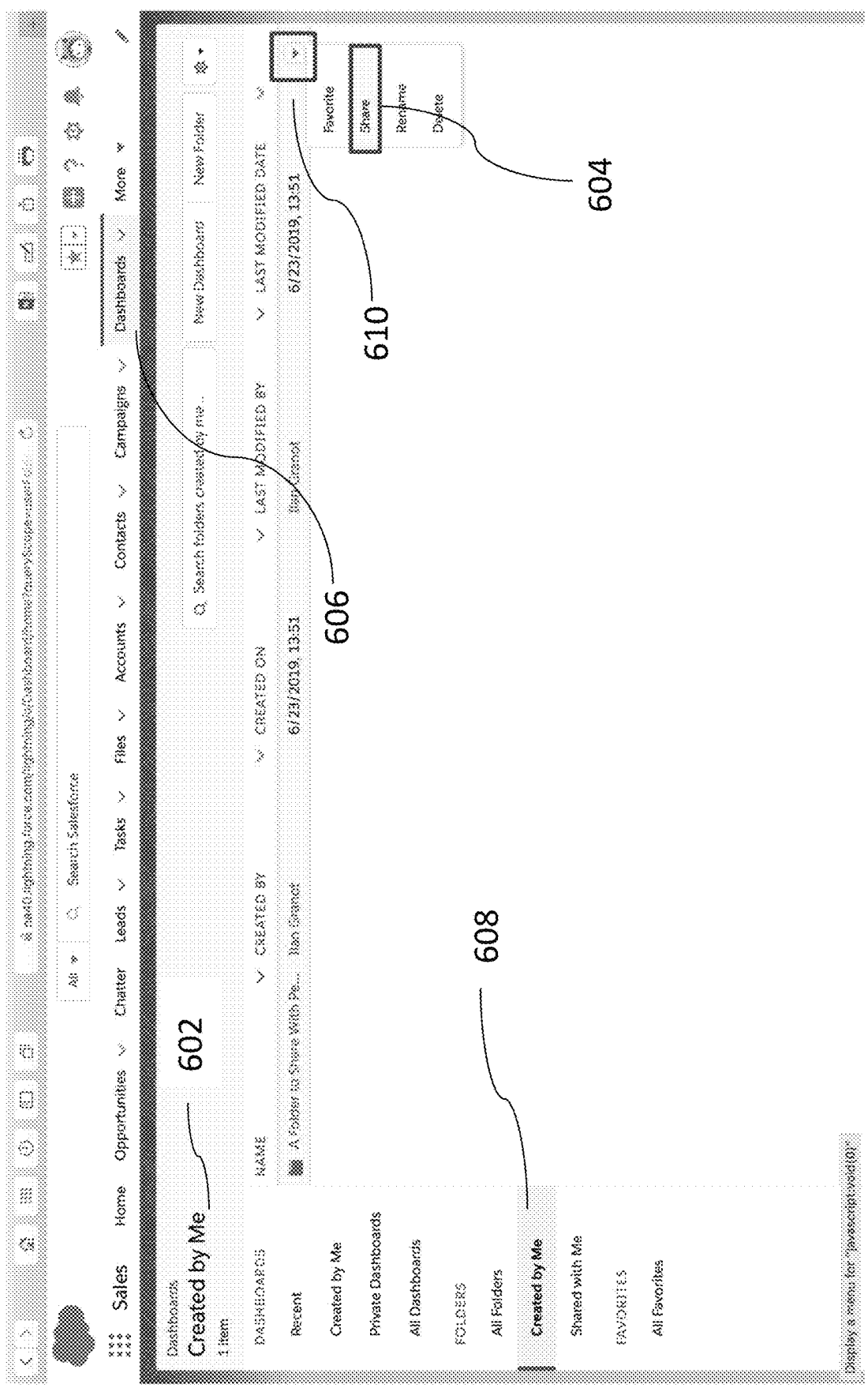
FIGS. 6A-6B are examples of a software screen "SW" with suggestions for possible desired actions, and a learning inference.
Figure 6B:
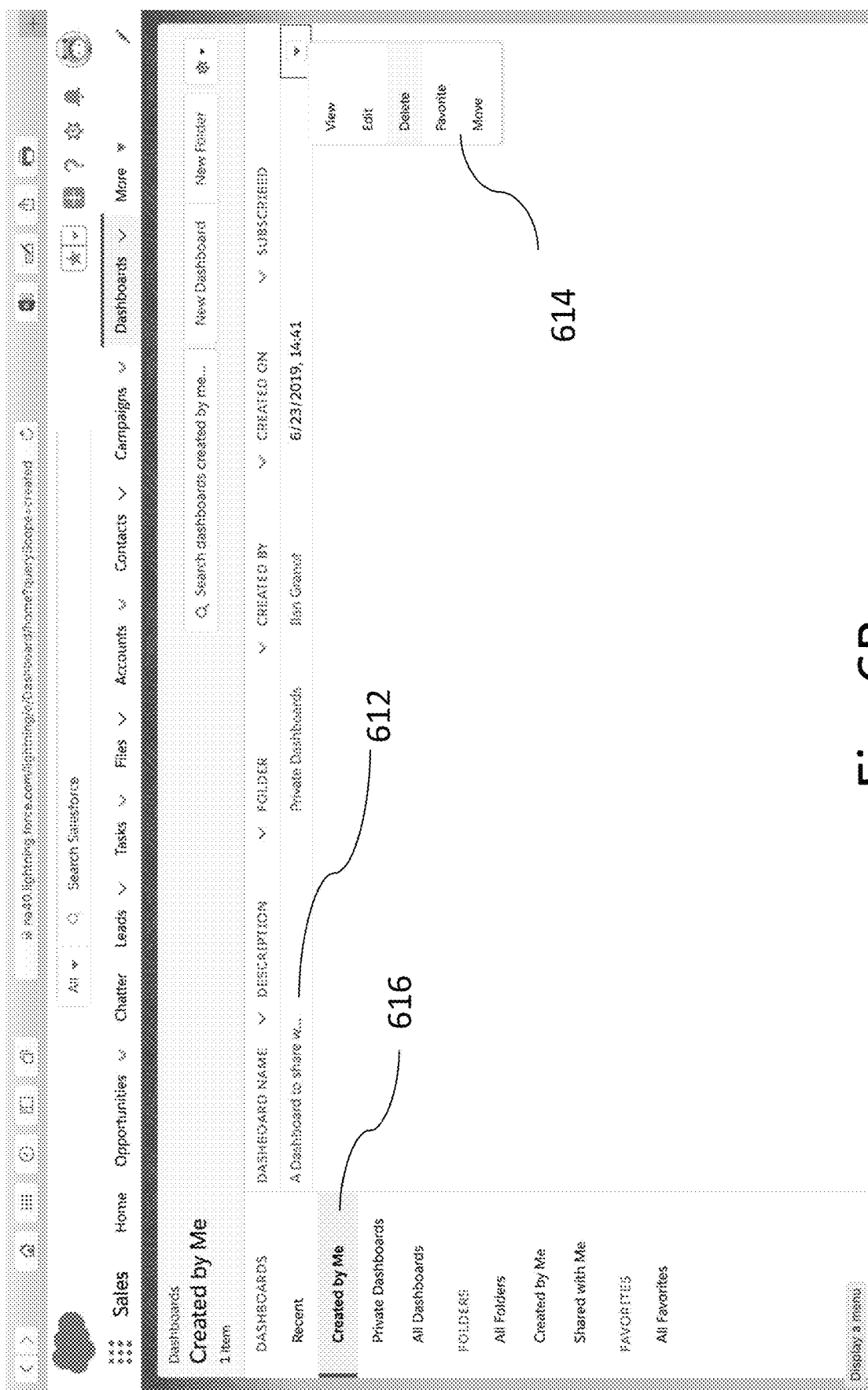
Figure 7:
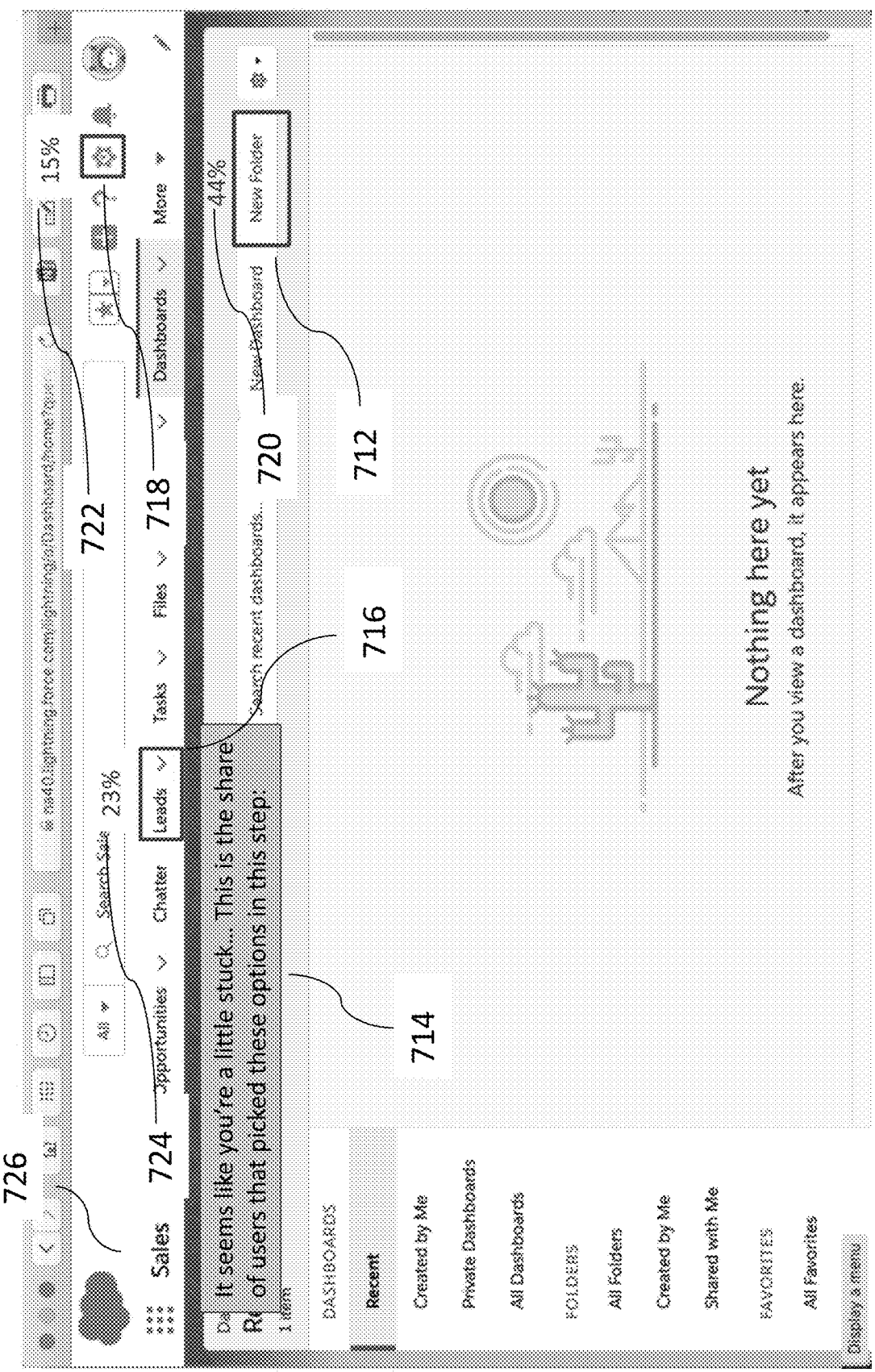
FIG. 7 is an example of software screen "SW" of suggestions with possible desired actions to click and a percentage associated with each suggestion.

Some of the problems that users encounter can be more complex. For example, there are cases when the user has a misconception about how to perform a certain process in order to achieve an objective in the SW. For these erroneous trials the system can "guess" the original intention and to suggest possible desired "end-goals". Illustrated in FIG. 6B is an example of a SW screen where a user may like to share a 'dashboard' 612 that has been created by the user 'created by me' 616. Yet, the user may not be able to do so because the SW does not have a 'share' option in the 'menu' 614 of that 'dashboard' entry. The problem here is that the user didn't perform the prerequisite steps that are needed for the sharing function of the 'dashboard' to work. The system could show to that user the correct sequence of operations; namely the following steps: to create a 'folder'—first, to move the 'dashboard' into it, and then to share that 'folder'. As explained in regards to FIG. 6A, the system could recommend the user to go to the "correct" screen—the first screen of the "popular path". Then the system could show the user, at each step, suggestions, such as, 610, 604 for the actions to perform in order to achieve the named objective. The system could recognize that the user is on a "popular path", but that the user did not travel that "common path" from the "beginning of path". Thus, by detecting that the "traveled path" is a part of the "common path" of "share a dashboard" it could advise the user the "end-goal" as a suggestion.

Another type of problem that users could encounter could be solved by detecting when the user starts to perform the correct set of operations in order to achieve a desired goal, but at a certain step along the way stops and gets "stuck". This type of problem could be detected by recognizing that the "traveled path" started at the screen of a "beginning of path", of a "popular path", but that the user did not reach the "end-goal" screen. The system could then show suggestions of possible "end-goals". These could be rendered from the "end-goals" of "popular paths" from the last node traveled with a "branching out" 1120 of nodes, before the user got "stuck".

Figure 11:
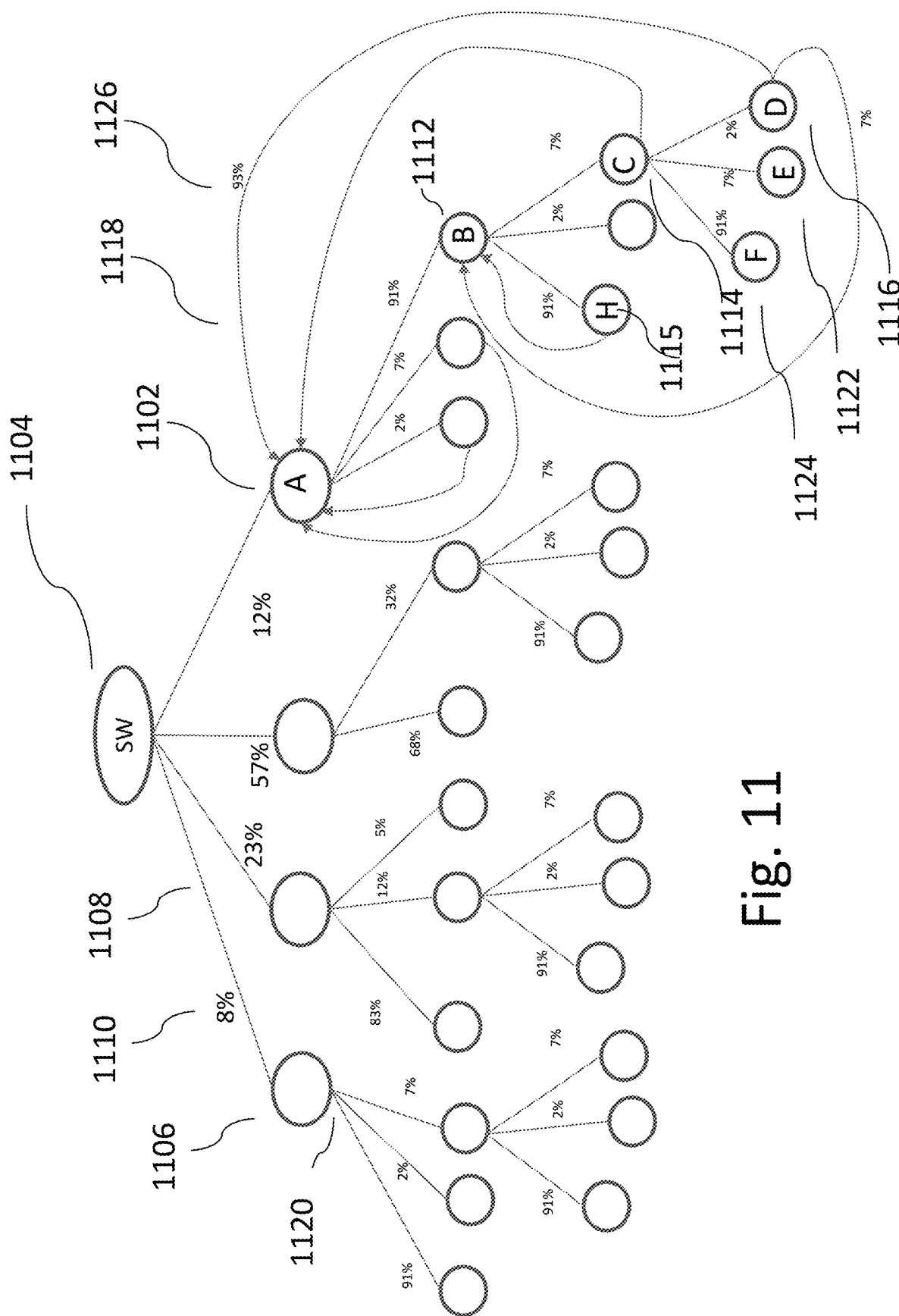
FIG. 11 is an additional example of an additional experience graph.

An additional option for the system to help users in the cases mentioned above is to recognize "popular paths" which are sequences of screens of the SW. These experience graphs could be ones popular among "experienced" users, and could include the interactions they performed within them. Specifically, by forming learning of an "experience graph" of these paths as illustrated in FIG. 11 which branches out from the main screen 1104 of the SW. The nodes 1106 represent a specific screen, the branches 1108 represent transition from one screen to another screen as a result of the user action, and the percentage 1110 represent the percents of the "experienced" users that traveled along that branch. Specifically, the system could form learning of "popular paths" by grouping common paths of "experienced" users. For example, a path where there are 2 or more connected nodes, such as the path between node A 1102 and node D 1116. Thus, node A 1102, could be the 'beginning of path' and node D 1116, could be the 'end of path'. Thus "end of path" could be shown at the "beginning of path", or along a path as a possible suggestion.

Let us consider an "inexperienced" user that started an interaction from the screen of node 'B' 1112, and got "stuck" at the screen of node 'H' 1115. It means that the user is "stuck" somewhere in the middle of a "popular path" between node A 1102 and node 'D' 1116. In such a case the system could suggest to the user the "end-goal" that is associated with node 'D' 1116, the "end-of-path" screen. If the user chooses that suggestion the system could direct the user to the 'beginning-of-path', node 'A' 1102, and could show the user directions of how to proceed from there to the user-chosen "end-goal" 'D' 1116.

The generation of the "end-goals" textual titles that are shown as suggestions 504, 506, 508 in the pop-up window 510 can be rendered using the following method: Use the 'END' screen of the end-goals stated above. And, render a textual name for the description of the suggestion which could be achieved through analyzing said last screen for its HTML properties to yield a text description of the objective through, for example, the extraction of the HTML 'title' tag or biggest 'H' tag (header) of that screen or page.

Figure 5A:
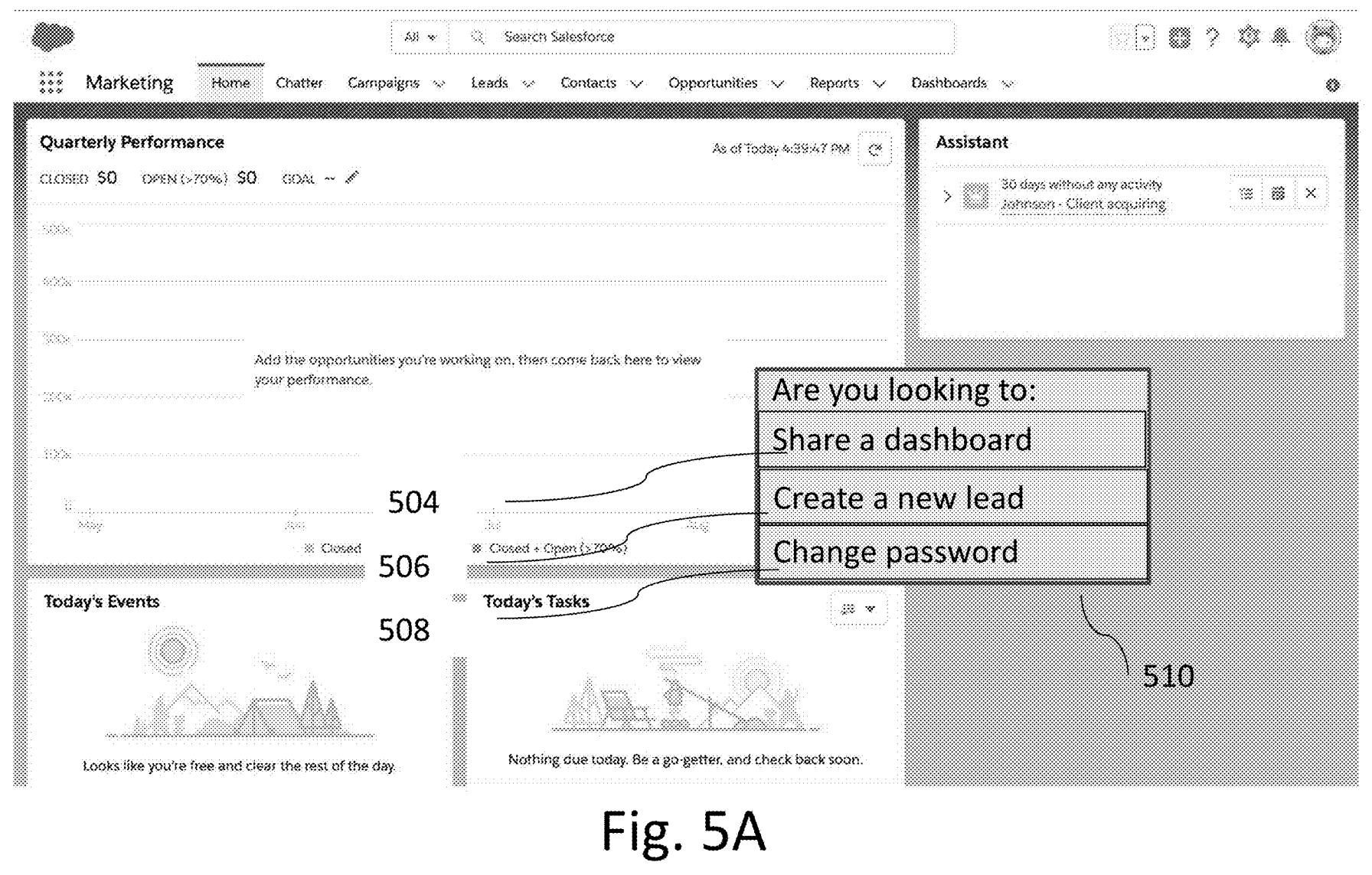
Figure 5B:
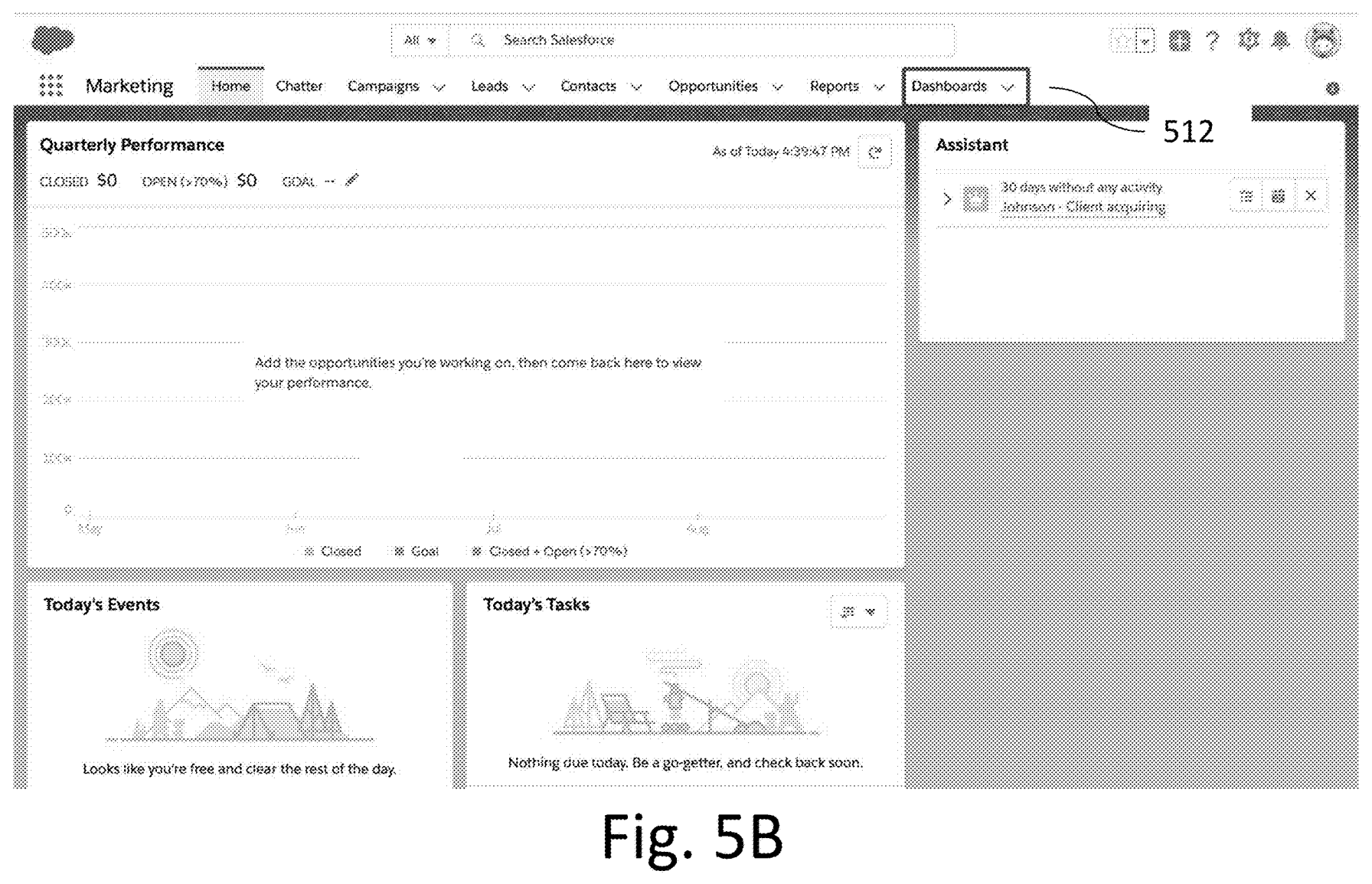

The system guidance could then be according to the user's indication of the user indicated "end-goal" which hopefully is the objective the user wants to achieve in the SW. Illustrated in FIG. 5A, using SalesForce.com as a SW example, with a popup menu 510 with suggestions for "end-goals" 504, 506, 508 for the user. Once the user selects one of these options the system could use the correlating steps taken by prior "experienced" users that have reached the target "end-goal". It could then display the 'suggestions' as indications for possible elements that the user could interact with, at each screen until achieving the "end-goal". For example, if a user chooses 'share a dashboard' 504 from the "end-goal" suggestions pop-up 510 the system could add guidance on the user screen first telling the user to click the 'Dashboards' menu-item 512, as illustrated in FIG. 5B. The system could then indicate the user, as illustrated in FIG. 6A, Dashboards 606, to click 'Created by me' 608 which could transition the SW to the screen 'Folders Created by Me' 602, 608, then the system could indicate to click the arrow-button to open menu 610 and to choose 'Share' 604.

Another option of when to show the "end-goals" suggestions is in the case where there are too many suggestions for possible next steps so it may confuse the user. Thus, when there are more than a few options, for example 3 suggestions for possible next steps, the suggestions may appear in the form of "end-goals" instead of markings for possible elements to click on the screen.

The list of 'end-goals' and "popular paths" could also be predefined manually during the process of the system set up in order to support specific software application needs. It is also possible that the system could use a "crawler" software method, that is, it could activate a program that "crawls" the structure of linkages between screens of a SW to map the SW structure. This could usually be done with a "crawler" program that is directed to the "home" screen of the "SW" and which travels the screens of the "SW" exhaustively between the links to form a map of these screens.

An additional option for the system is to provide help to experienced user. To assist the system to form learning of better ways to use the SW. The system could detect paths where some "experienced" users completed a path from the first to the last screens using fewer steps. This may occur due to either a "shortcut" operation in one of the screens or by using keyboard shortcuts. For example, an "experienced" user may have went directly from screen 'A' 1102 to screen 'C' 1114 by using a "shortcut" link. These suggestions may be shown to "experienced" users at the beginning of paths that enable such shortcuts. In this example, a suggestion for a shortcut could be shown on the first screen 'A' 1102, where it could be useful, in the form of a message on the screen about using the shortcut to achieve an improvement in SW usage.

Another method for a suggestions system is to leverage the accumulated knowledge of how the 'experienced' users use the SW for semi-automatic interaction with the SW. In such case the system could ask the user to select his objective, that is, the user's 'end-goal'. The choice could be made by mouse clicking as presented in reference to FIG. 5A or even by voice in which the user states the objective and the system uses speech to text such as a neural network based tool, to select the best fit and confirm such with the user. Once the user selects the objective the system can guide the user or even act according to the prior choices of a typical 'experienced' user who ended up performing the task resulting with the declared objective. Looking on just the learning from 'experienced' users who end up with the declared objective the system build an experience graph—"EG". The experience graph 302 could be similar to FIG. 3 having nodes 310 and branches 312. For each branch a percent of selection 'PS' 314 is attached. The system could operate using the following flow chart:

A. For the current Node if there is a Branch with PS of more than 90% select it and go to B. If not go to D B. Do the operation accordingly. Note: if the operation is not just one selection such as making a choice between multiple options, or fill in a text, than wait for the user to do it. Once the user had hit enter, go to C.

C. If done indicate "END". Otherwise go to A.

D. Highlight all the Branches having PS of over 25% and with light indication all other Branches. Once the user made a choice of a Branch go to B.

Using the list of 'end-goals' it is possible to create an interactive chat or voice based system that uses Natural Language Processing (NLP) techniques to create a conversational "chatbot" that could relate a natural-language user's request to one of the 'end-goals' in the list. Such a process of interactive conversation between the user and the system could be initiated by saying "Computer please help me", for example, to the microphone component of the computer. The user's computer or device could then pronounce in human voice the "end-goals" back to the user, and the user could state in plain words his desired 'end-goal'. It is also possible to use the keyboard to do the same using, for example, a text chat function.

In many software products (SW) the users of the software may fill-in forms. It is of value to learn the best ways to fill-in forms from the "experienced" users. Such learning could consist of which fields are most commonly used, the sequence of entering the information by users and in some cases recognizing the type or style of information to be entered.

Figure 8A:
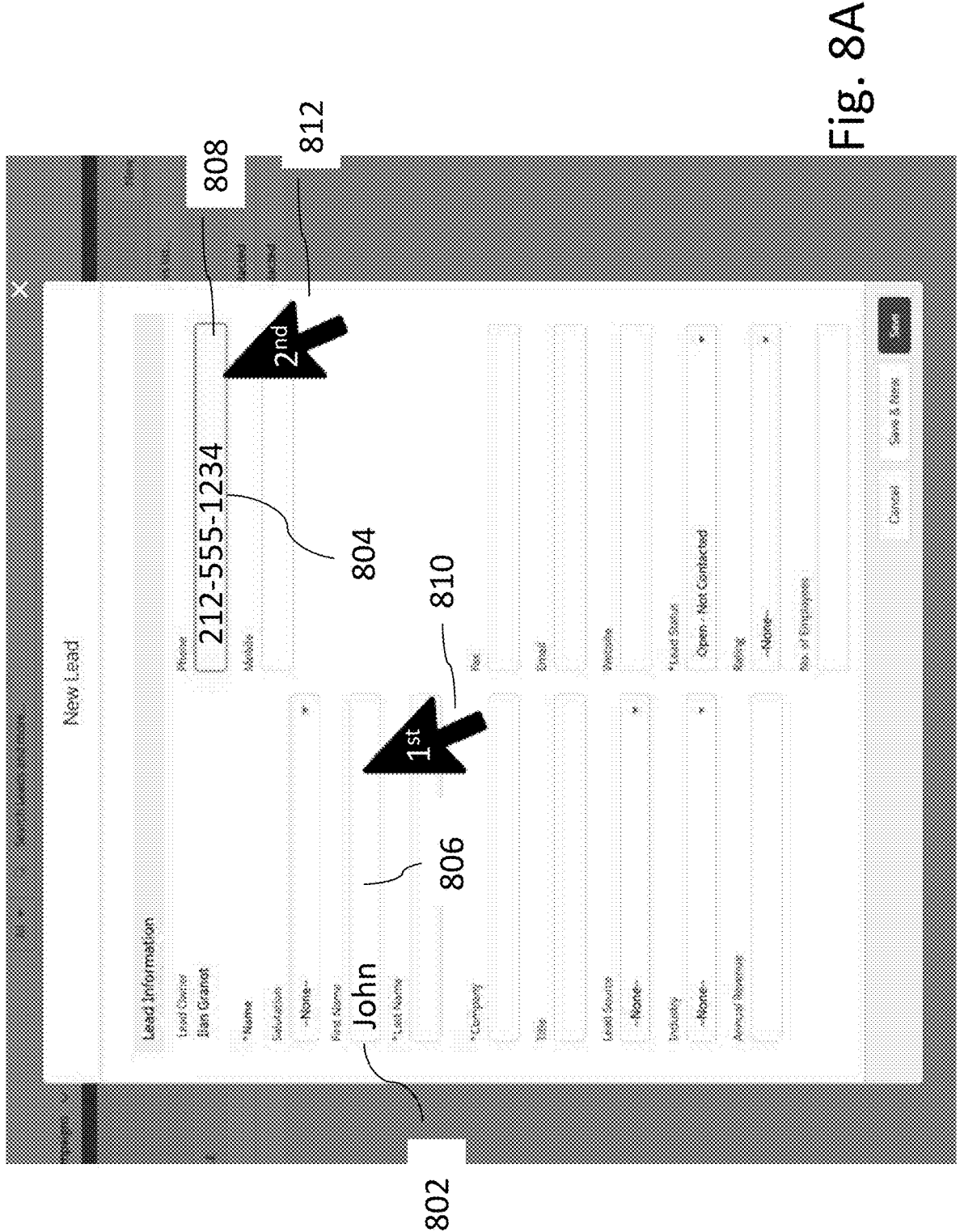
Figure 8B:
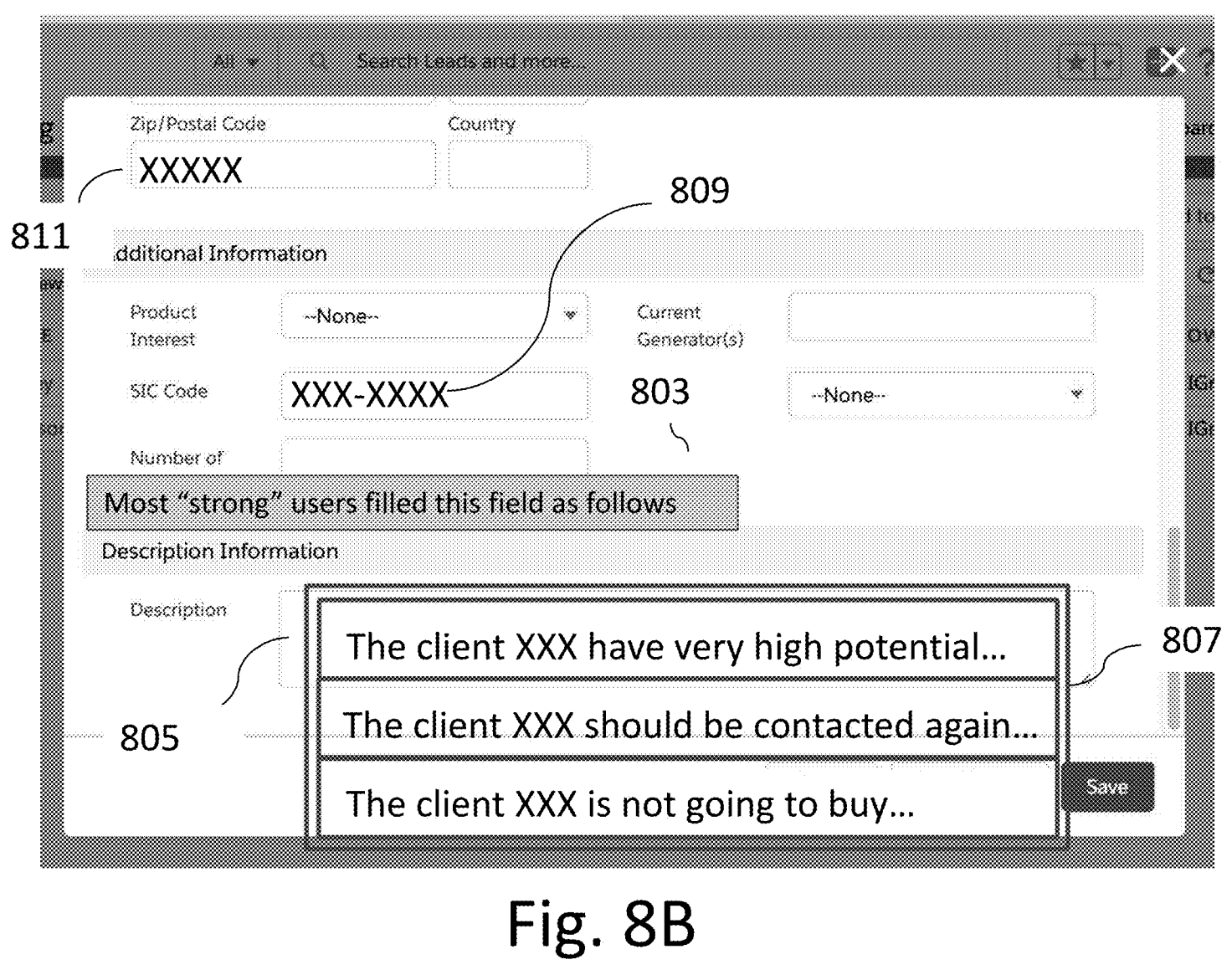
Figure 8C:
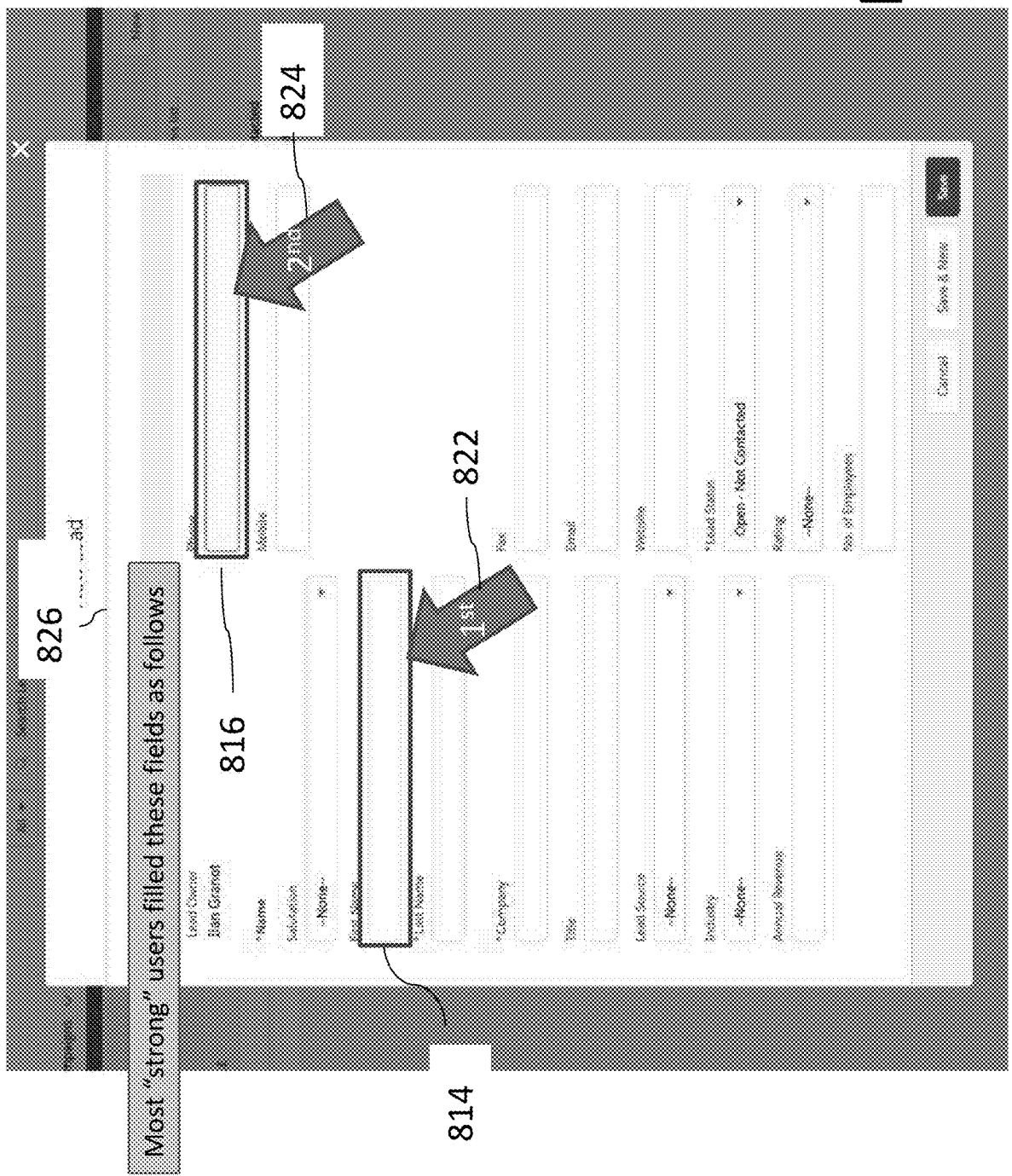

Illustrated in FIG. 8A is an exemplary form which contains fields with user entries. The learning could be about which selections the user made and the sequence of the selections made by the user. Illustrated here is a partial sequence of the 1st and 2nd operations 810, 812. So the suggestions to the user could be from the most popular fields that were used by "experienced" users, but they could not contain their contents. As illustrated in FIG. 8C the suggestions may be accompanied by a message explaining the suggestions 826 and markings of which fields to fill-in 814, 816, and may include the sequence in which to fill-in the fields 822, 824.

In many cases data entry inputs are specific to each user, that is, a 'specific user-data' is entered into the SW. In the example illustrated in FIG. 8A fields of the form such as, first name 806, phone number 808 and so forth could contain 'specific user-data'. The system could detect these fields as containing 'specific user-data' entries by recognizing that a plurality of users entered highly varied inputs into these fields of the form. For example, in the first name and the telephone fields, different users could enter different text strings for different first names 802, and different numbers for different telephone numbers 804.

In cases where the system detects a form that contains 'specific user-data' it is possible to perform analysis on the inputs previously made in order to find common text patterns. For example, the minimum length of characters in the input string, a phone number pattern, etc. Such learning about the inputs can later be shown on the screen to other users as suggestions in the form of a template for data entry as illustrated in FIG. 8B. For example, clicking fields 809, 811 could show X's marking the average length or common pattern for entry. Another example is when the "Description" box of the form 805 is clicked a popup with suggestions 807 is shown with the common text patterns to choose from. These patterns contain one or multiple 'X' characters to indicate where these text patterns contain a high variability of characters. A title 803 with explanation of the popup can also be shown. It is also possible to make the system work without tracking any of the 'specific user-data' inputs. This can be done in order to improve the privacy of the users.

Figure 9A:
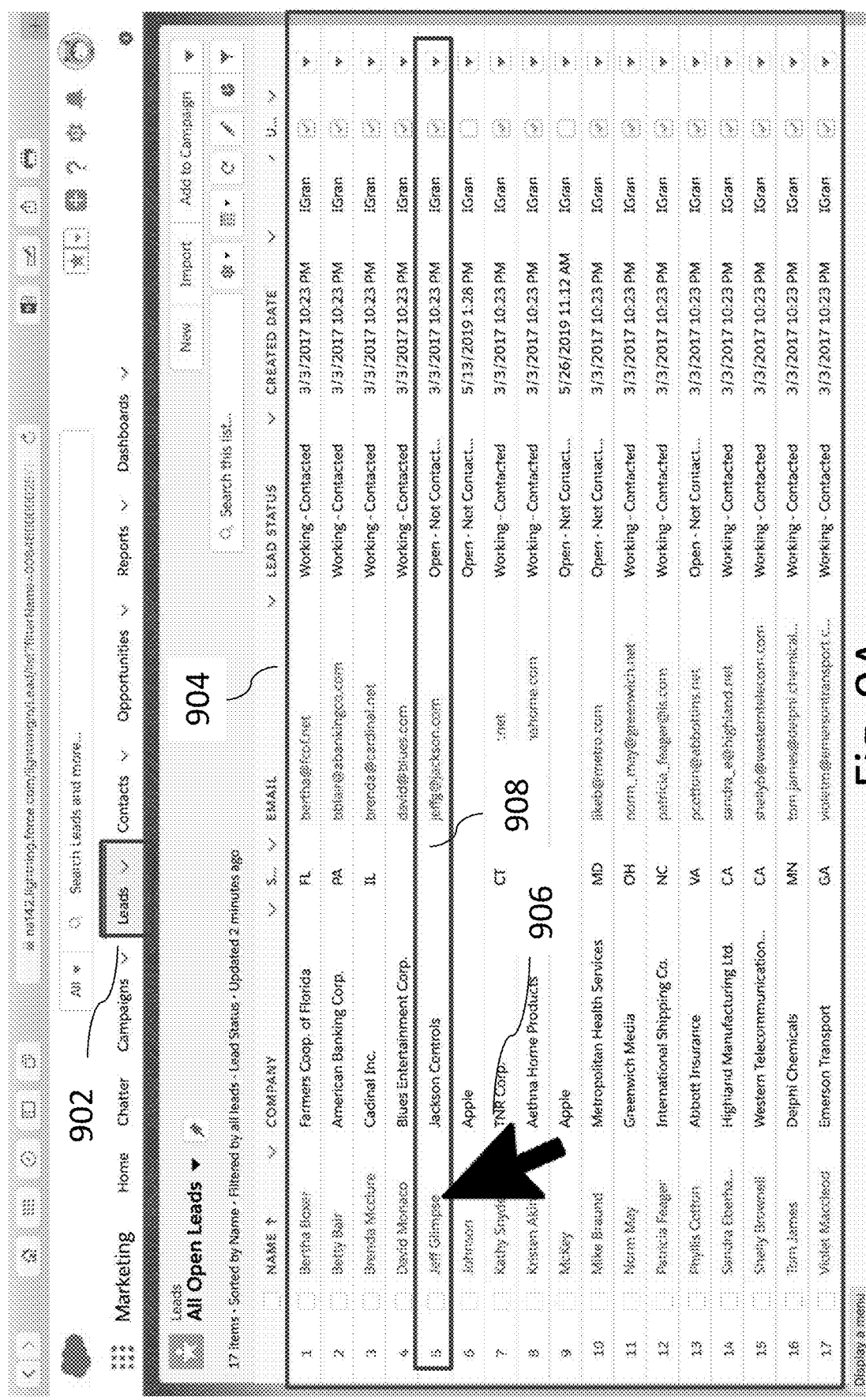
Figure 9B:
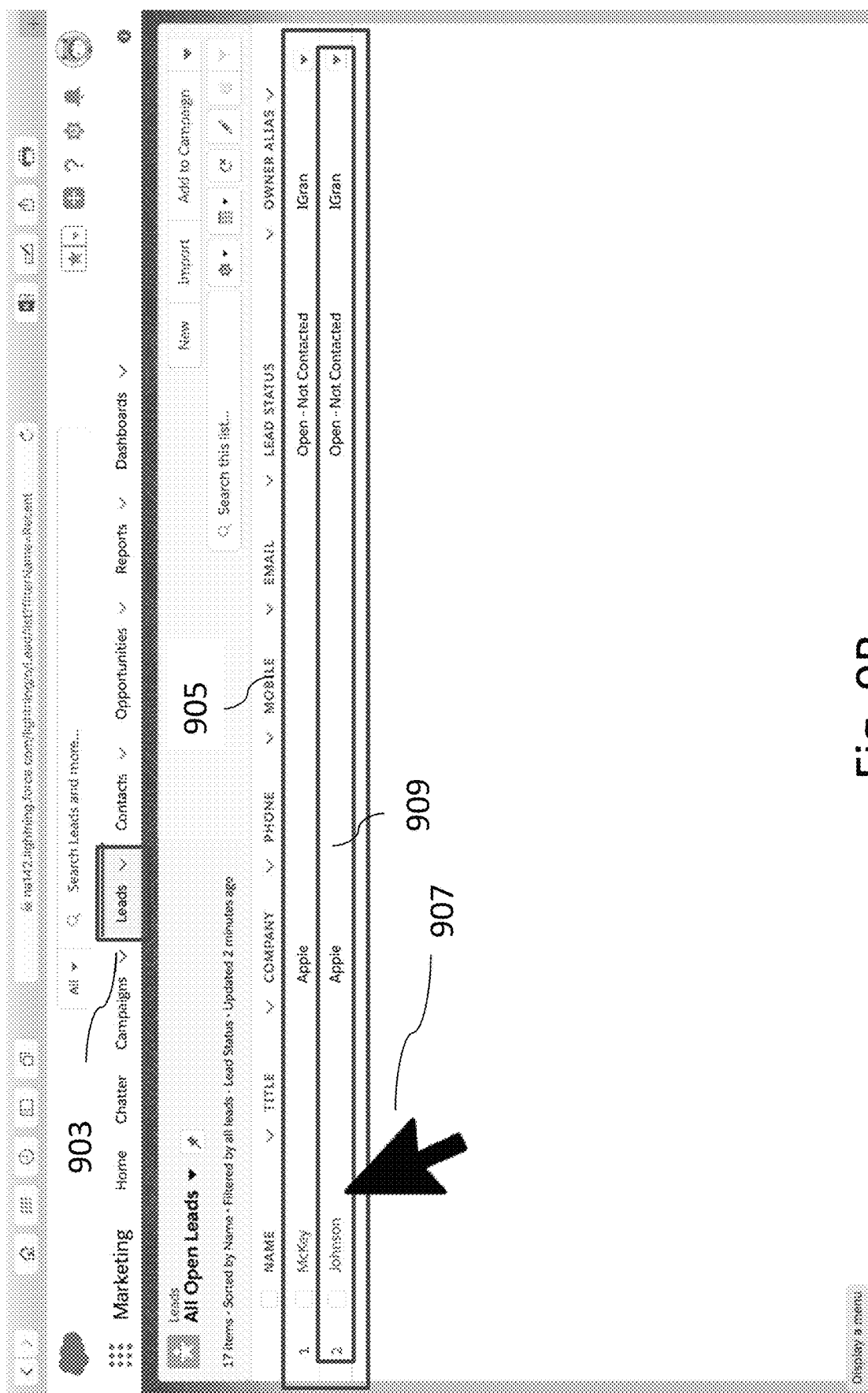

It is common that the SW stores 'specific user-data'. Consequently, different contents could be shown for different users on various screens of the SW. In such cases the system could need to infer a general action from the private cases performed by the 'experienced' users on these screens. Once the system has learned it could be able to show how to do the 'general action' as a 'suggestion' which applies to every user regardless of the 'specific user-entries' that are showing on the user's screen. For example, FIG. 9A and FIG. 9B show the same type of screen of the SW for two different users, each screen contains a different list of 'specific user-entries' 908, 909. In this case each user is selecting a "lead" from a personal list of "leads". Thus the selection 906 done by a user for a 'specific user-entry' 908 "lead" is done from the user's own user-specific 'produced list' 904 of "leads". And another user's selection 907 of a 'specific user-entry' 909 could be from that user's own 'produced list' of "leads" 905.

The system could perform the learning as follows: In the case of users clicking on 'specific user-entries' the learning could be from the 'specific user-entries' selections made by the plurality of 'experienced' users. The selections performed for a SW screen could be grouped by a common attribute that is related to the common area that contained the plurality of these 'specific user-entries' selections. Such an attribute could be the ID of the displayed 'content section' ("CS"), such as an HTML tag where a section ID='leads'. Such 'specific user-entries' selections could be recognized by their content section and grouped to form a general action. So in the illustrated example there could be multiple 'specific user-entries' selections such as 906, 907 (usually from more than two different users), and all of them could be in the same 'content section' which is the 'produced list' of "leads" displayed on the SW screen.

As an alternative, the 'general actions', and 'specific user-entries' could also be predefined manually during the process of the system set up in order to support specific software application needs.

Figure 9C:
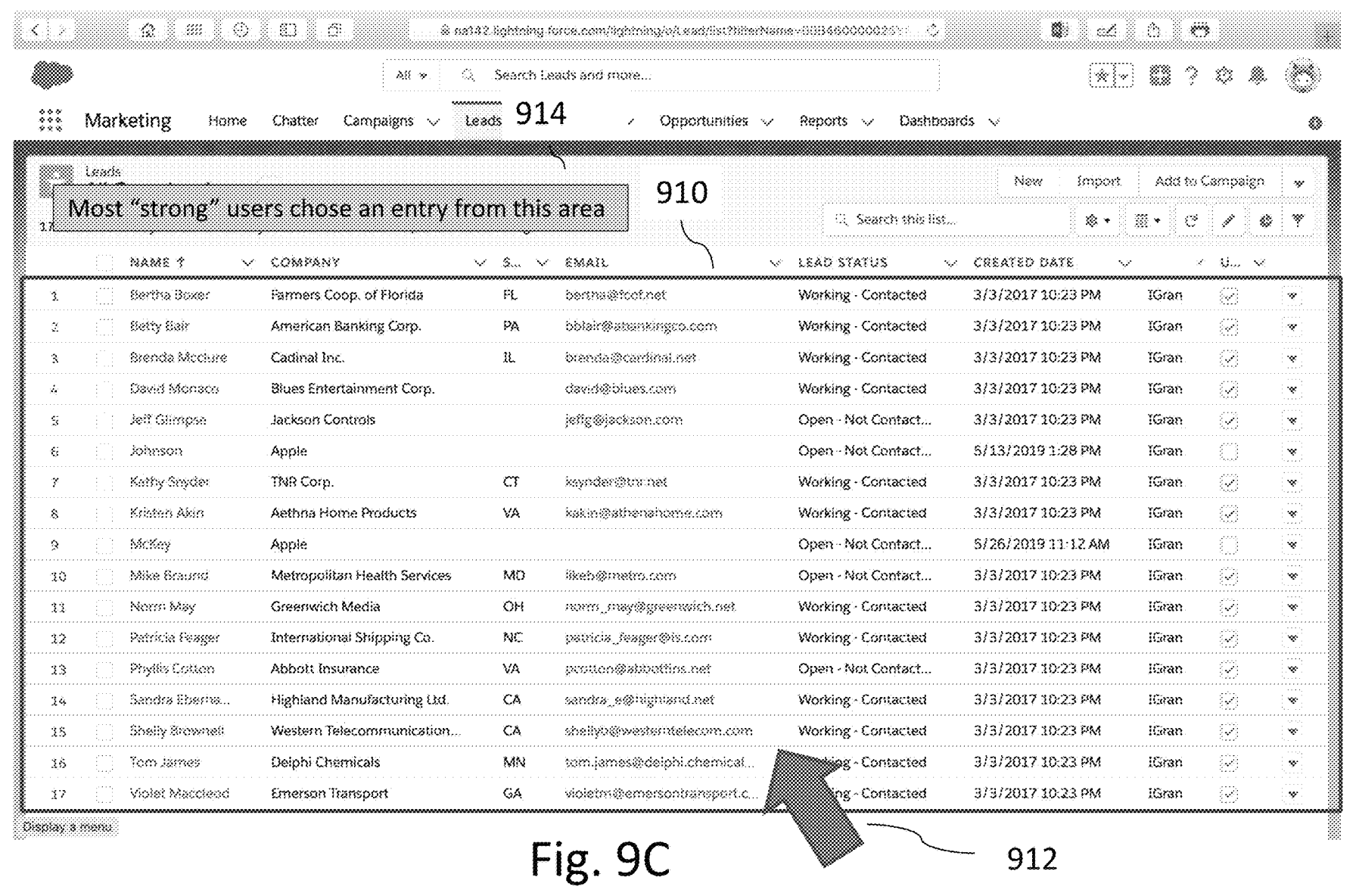

The displayed 'suggestion' for the 'general action' learned is illustrated in FIG. 9C. Specifically, it could contain an explanation message 914, and a rectangle around the entire selection area 910 which implies to the user that the user can select any entry within that rectangle. Also illustrated is an arrow 912 pointing to the general action area of selection.

Figure 10A:
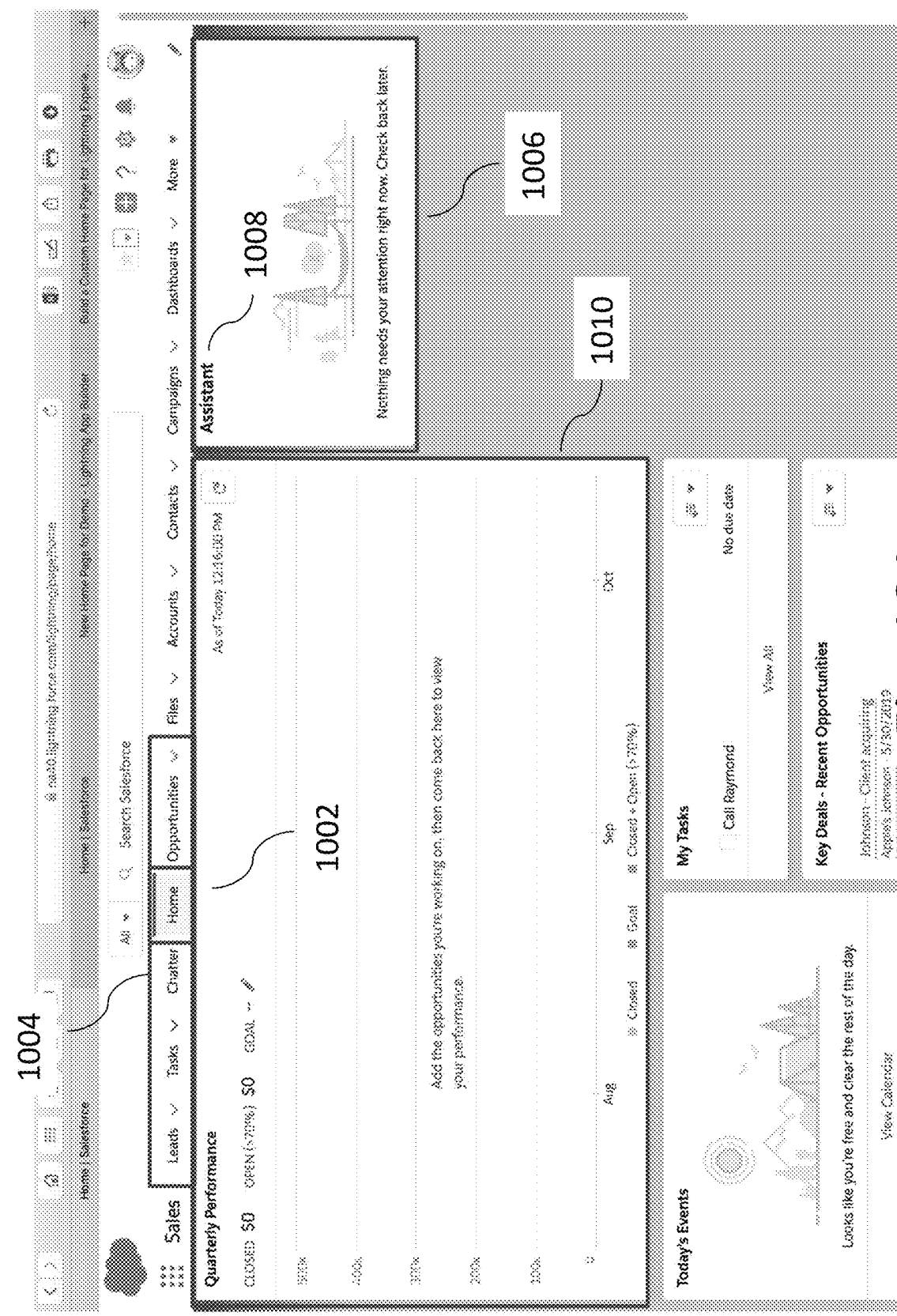
FIGS. 10A-10B are examples of learning from different windows positioning in user customized screens.
Figure 10B:
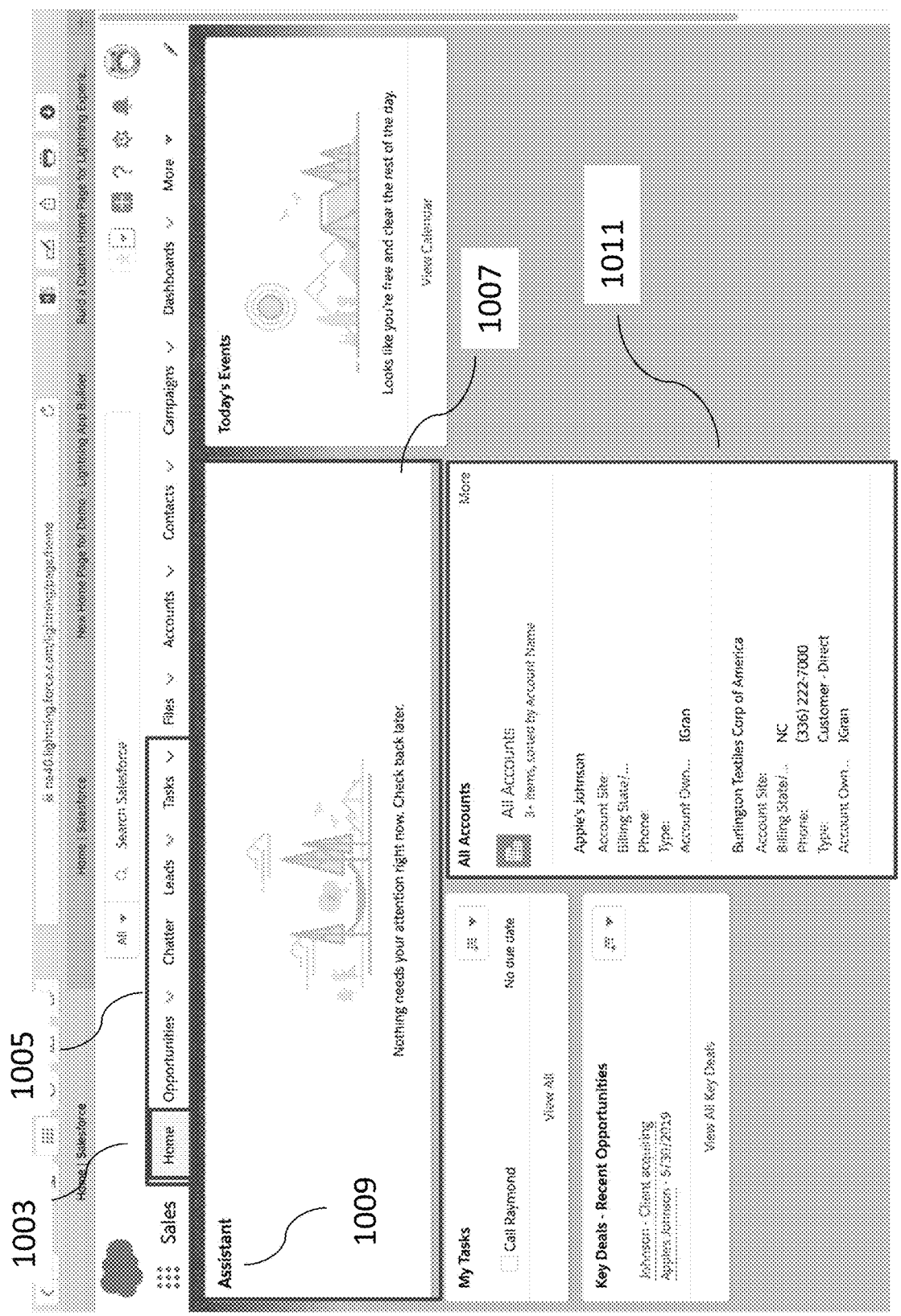

In some cases in the SW the user could have an option to rearrange the interface screen to his liking. Shown in FIG. 10A and FIG. 10B are the customized home screens of two users. In such scenarios users can move windows in the screen to different locations and even to reshape them. For example, in these illustrations the home screen of each of two users shows a window with the same purpose, and a title "Assistant" 1008, 1009 located at two different locations 1006, 1007. In order for the system to form a learning even when these screens are customized it could include a module to map the input of a specific user set-up to a standard set-up map. By mapping all users to a standard setting learning and aggregating user experience could be applied. Additionally, using this method the removal of some of the windows from the view of a certain user could not negatively affect other users, as shown in the illustration, for windows 1010, 1011 each show for one user but not to the other.

Specifically, the learning when screens are customized could work as follows: first the system could recognize a 'user choice' made in a customized area on a SW screen. This is done through scanning the structure of the current user screen setup for its elements, and recognizing the common sections on the screen where users have made actions within them. For example, a table with the information about a user's key metrics, to do list, etc. can show for one user on the left side of the screen and that list could show the user's related information, whereas for a different user of the same SW the list could show somewhere else on the screen and could show a different information related to that specific user. Nevertheless, both content areas of the SW could contain webpage information, for example in online SW, which could point to the same type of context or source. Albeit their different locations the HTML id of each differently located area could be the same. Also, for most webpages same purpose windows could have the same title as illustrated in 1008, 1009 and could usually contain the same HTML id.

Alternatively the Transmit interaction 106 could also transmit the user interaction in setting up the user choice of the displayed page layout for easier mapping forming a user specific page layout to a standard layout to aggregate various user use of the SW-learning. The Present assist 105 could include a utility to map back the assist indication to the user specific page layout.

Furthermore, the system could learn even when other elements on the screen are customized, such as, menu items. Illustrated in FIG. 10A and FIG. 10B is a menu where the order of the 'menu buttons' elements 1004, 1005, is different. Any selection that is made by a user is tracked by the element's HTML id which is not related to the location of the element in the menu, or on the screen. This is also the case for the button that is related to the current selected screen "Home" 1002, 1003 which in each figure is located differently, but is still learned the same. It is also the case for any other clicked element in menu items 1004, 1005.

These 'content sections' could also be predefined manually during the process of the system set up as user specific in order to support specific software application (SW) needs.

Herein the use of some terms could be considered in a broader meaning and include similar terms without specifically name them. An artisan in the art could adapt the techniques presented herein to these alternative devices. For example the terms mouse and keyboard could represent in general user tools for interacting with a computing system. These terms could reference other input means such as touch screen, stylus pen, microphone, and joystick. The computing system could be tablet or Smartphone. While the user interacts with the computing system using these input devices and watching the display screen, the software (SW), the Transmit interaction 106 and the present assist 105 could be running on the user device, on the internet as a web page with some server support in the background, on a server as part of a non-web multi user system, on a cloud server and any combination of such. Similarly the Advisor 110 could be resident in the cloud server or any other form of system set up enabling the implementation of the techniques presented here.

It could also be appreciated by persons of ordinary skill in the art that the invention is not limited to what has been particularly shown and described hereinabove. For example, drawings or illustrations may not show details of UI Advisor 110 construction or design for clarity in illustration. Further, combinations and sub-combinations of the various features described hereinabove may be utilized. Rather, the scope of the invention includes both combinations and sub-combinations of the various features described hereinabove as well as modifications and variations which could occur to such skilled persons upon reading the foregoing description. Rather, the scope of the invention includes combinations and sub-combinations of the various features described hereinabove as well as modifications and variations which would occur to such skilled persons upon reading the foregoing description. Thus, the invention is to be limited only by appended claims.

We claim:

1. A server system, the server system comprising:
   a memory processor comprising memory;
   a communication link,
      wherein said memory comprises a plurality of prior user interface experience records, and
      wherein each of said prior user interface experience records represent a user interaction with a plurality of user interface screens of a software tool;
   a first program designed to categorize user interface experience into at least two groups,
      wherein said at least two groups comprise an experienced users group and an inexperienced users group,
      wherein said experienced users group comprises individual experienced users, and
      wherein each one of said individual experienced users demonstrates a better than average proficiency of said user software tool;
   a second program designed to construct a user interface experience graph from said experienced users group's interface experience with said software tool; and
   a third program designed to use said user interface experience graph to communicate suggestion notes to at least one user of said software tool,
      wherein said suggestion notes are designed to help said at least one user interface with said software tool.

2. The server system according to claim 1,
wherein said second program is designed to construct a list of end-goals for said specific software tool from said plurality of prior user interface experience records with said specific software tool, and
wherein said list of end-goals comprises at least one end-goal.

3. The server system according to claim 1,
wherein said second program is designed to construct a list of popular user paths for said specific software tool from said plurality of prior user interface experience records of interfacing with said specific software tool.

4. The server system according to claim 1,
wherein said inexperienced users group user interface experiences comprises a significant portion of said user interface experiences.

5. The server system according to claim 1,
wherein said categorize utilizes a time attribute associated with said user interface experience.

6. The server system according to claim 1,
wherein said categorize utilizes scrolling up and down, or use of a help function, or navigating back and forth attributes associated with said user interface experiences.

7. The server system according to claim 1,
wherein said first program is designed to form a list of experienced users.

8. A server system, the server system comprising:
a memory processor comprising memory;
a communication link,
a first program designed to construct a list of end-goals for a software tool,
  wherein said memory comprises a plurality of prior user interface experience records, and
  wherein each of said plurality of prior user interface experience records represent a user interaction with a plurality of user interface screens of said software tool;
a second program designed to build a user experience graph based on said plurality of prior user interface experience records,
  wherein said construct a list of end-goals for a software tool comprises at least one end-goal; and
a third program designed to use said list of end-goals to communicate to at least one user of said software tool suggestion notes based on popular paths along said user experience graph leading towards said end-goal to help said at least one user interface with said software tool.

9. The server system according to claim 8,
wherein said first program is designed to categorize user experience into at least two groups,
wherein said at least two groups comprise an experienced users group and an inexperienced users group, and
wherein said categorize utilizes scrolling up and down, or use of the help function, or navigating back and forth attributes associated with said user interface experience.

10. The server system according to claim 8,
wherein said second program is designed to construct a list of popular user paths for said specific software tool from said plurality of prior user experience records interfacing with said specific software tool.

11. The server system according to claim 8,
wherein said first program is designed to categorize user experience into at least two groups,
wherein said at least two groups comprise an experienced users group and am inexperienced users group, and
wherein said categorize utilizes a time attribute associated with said user experience interfacing.

12. The server system according to claim 8,
wherein said third program is designed to receive a request by said communication link and to send a response using said communication link, and
wherein said response comprises information based on said list of end-goals.

13. A server system, the server system comprising:
a memory processor comprising memory;
a communication link,
  wherein said memory comprises a plurality of prior user interface experience records,
  wherein each of said records represent a user interaction with a plurality of user interface screens of a software tool;
a first program designed to categorize user experience into at least two groups,
  wherein said at least two groups comprise an experienced users group and an inexperienced users group,
  wherein said experienced users group comprises individual experienced users, and
  wherein each one of said individual experienced users demonstrates proficiency in said software tool;
a second program designed to construct a list of popular user paths from said experienced users group's interface experience of said software tool; and
a third program designed to use said list of popular user paths to communicate to at least one user of said software tool suggestion notes to help said at least one user interface with said software tool.

14. The server system according to claim 13,
wherein said second program is designed to construct a user interface experience graph for said specific software tool from a plurality of prior user interface experience records with said specific software tool.

15. The server system according to claim 13,
wherein said inexperienced users group comprises a significant portion of said user experience.

16. The server system according to claim 13,
wherein said third program is designed to receive a request by said communication link and to send a response using said communication link, and
wherein said response comprises information based on said list of popular user paths.

17. The server system according to claim 13,
wherein said categorize utilizes scrolling up and down, or use of a help function, or navigating back and forth attributes associated with said plurality of user experience interfacing.

18. The server system according to claim 13,
wherein said second program is designed to construct a list of end-goals for said specific software tool from said plurality of prior user interface experience records with said specific software tool,
wherein said list of end-goals comprises at least one end-goal.

19. The server system according to claim 8,
wherein said categorize utilizes a time attribute associated with said plurality of user interface experience records.

20. The server system according to claim 8,
wherein said first program is designed to form a list of experienced users.

* * * * *